(12) United States Patent
Lam et al.

(10) Patent No.: US 10,676,552 B2
(45) Date of Patent: Jun. 9, 2020

(54) ETHYLENE COPOLYMER HAVING ENHANCED FILM PROPERTIES

(71) Applicant: NOVA Chemicals (International) S. A., Fribourg (CH)

(72) Inventors: Patrick Lam, Calgary (CA); Victoria Ker, Calgary (CA); Mark Kelly, Airdrie (CA)

(73) Assignee: NOVA Chemicals (International) S.A., Fribourg (CH)

( * ) Notice: Subject to any disclaimer, the term of this patent is extended or adjusted under 35 U.S.C. 154(b) by 151 days.

(21) Appl. No.: 15/985,039

(22) Filed: May 21, 2018

(65) Prior Publication Data

US 2018/0346623 A1  Dec. 6, 2018

(30) Foreign Application Priority Data

May 30, 2017 (CA) .................................... 2969627

(51) Int. Cl.
| | | |
|---|---|---|
| *C08F 210/16* | (2006.01) | |
| *C08J 5/18* | (2006.01) | |
| *C08F 2/34* | (2006.01) | |
| *C08F 4/642* | (2006.01) | |

(Continued)

(52) U.S. Cl.
CPC .............. *C08F 210/16* (2013.01); *C08F 2/34* (2013.01); *C08F 4/6425* (2013.01); *C08F 4/6493* (2013.01); *C08F 4/65916* (2013.01); *C08J 5/18* (2013.01); *C08F 2500/04* (2013.01); *C08F 2500/08* (2013.01); *C08F 2500/12* (2013.01); *C08F 2500/18* (2013.01); *C08F 2500/26* (2013.01); *C08J 2323/08* (2013.01)

(58) Field of Classification Search
CPC ........ C08F 210/16; C08F 2/34; C08F 4/6425; C08F 4/6493; C08F 4/65916; C08F 2500/04; C08F 2500/08; C08F 2500/12; C08F 2500/18; C08F 2500/26; C08J 5/18; C08J 2323/08
USPC ....................................................... 526/107
See application file for complete search history.

(56) References Cited

U.S. PATENT DOCUMENTS

| | | |
|---|---|---|
| 3,779,712 A | 12/1973 | Calvert et al. |
| 4,127,507 A | 11/1978 | Fannin et al. |
| 4,250,288 A | 2/1981 | Lowery, Jr. et al. |

(Continued)

OTHER PUBLICATIONS

Peri, J.B. and Hensley, Jr., A.L.; The Surface Structure of Silica Gel; The Journal of Physical Chemistry; vol. 72, No. 8, Aug. 1968; pp. 2926-2933.

(Continued)

*Primary Examiner* — William K Cheung
(74) *Attorney, Agent, or Firm* — Lawrence T Kale

(57) ABSTRACT

The disclosure provides an ethylene copolymer having a density of from 0.912 g/cm³ to 0.925 g/cm³, a melt flow ratio ($I_{21}/I_2$) of from 20 to 30, and a normal comonomer distribution profile in a GPC-FTIR analysis, wherein the normal comonomer distribution profile has a slope of from −3.5 to −7.5, where the slope is defined as the number of short chain branches per 1000 carbons at a molecular weight of 300,000 minus the number of short chain branches per 1000 carbons at a molecular weight of 30,000. The ethylene copolymers have improved bulk density and when made into film, provide good physical properties.

15 Claims, 8 Drawing Sheets

GPC-FTIR of Inventive Ethylene Copolymer 1

GPC-FTIR of Inventive Ethylene Copolymer 2

(51) Int. Cl.
C08F 4/649 (2006.01)
C08F 4/659 (2006.01)

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 4,719,193 | A | 1/1988 | Levine et al. |
| 4,888,318 | A | 12/1989 | Allen et al. |
| 5,028,670 | A | 7/1991 | Chinh et al. |
| RE33,683 | E | 9/1991 | Allen et al. |
| 5,055,533 | A | 10/1991 | Allen et al. |
| 5,139,986 | A | 8/1992 | Cook et al. |
| 5,317,036 | A | 5/1994 | Brady, III et al. |
| 5,342,749 | A | 8/1994 | Sakanoue et al. |
| 5,352,749 | A | 10/1994 | DeChellis et al. |
| 5,405,922 | A | 4/1995 | DeChellis et al. |
| 5,436,304 | A | 7/1995 | Griffin et al. |
| 5,453,471 | A | 9/1995 | Bernier et al. |
| 5,462,999 | A | 10/1995 | Griffin et al. |
| 5,616,661 | A | 4/1997 | Eisinger et al. |
| 5,668,228 | A | 9/1997 | Chinh et al. |
| 6,191,239 | B1 | 2/2001 | Ford et al. |
| 6,228,792 | B1 | 5/2001 | Carney |
| 6,417,301 | B1 | 7/2002 | Ford et al. |
| 6,689,847 | B2 | 2/2004 | Mawson et al. |
| 6,825,293 | B1 | 11/2004 | Goyal et al. |
| 7,211,535 | B2 | 5/2007 | Kelly et al. |
| 7,651,969 | B2 | 1/2010 | Kong et al. |
| 7,671,149 | B2 | 3/2010 | Kelly et al. |
| 7,893,180 | B2 | 2/2011 | Ford et al. |
| 8,993,693 | B2 | 3/2015 | Lu et al. |
| 9,487,608 | B2 | 11/2016 | Lu et al. |
| 2002/0165330 | A1* | 11/2002 | Cady ................. C08L 23/0815 526/160 |
| 2011/0212315 | A1 | 9/2011 | Fantinel et al. |

OTHER PUBLICATIONS

Pangborn, Amy B.; Giardello, Michael A.; Grubbs, Robert H.; Rosen, Robert K. and Timmers, Francis J.; Safe and Convenient Procedure for Solvent Purification; The American Chemical Society (1996); Organometallics, vol. 15; pp. 1518-1520.

Noshay, A. and Karol, F.J.; Transition Metal Catalyzed Polymerizations; Ziegler-Natta and Metathesis Polymerizations—Chemical Activation of Silica Supports for Chromocene-Based Polyethylene Catalysts; Cambridge University Press (1988); pp. 396-416.

ASTM D5748-95 (Reapproved 2012); Standard Test Method for Protrusion Puncture Resistance of Stretch Wrap Film; Copyright ASTM International; Current edition approved Apr. 1, 2012. Published May 2012. Originally approved in 1995. Last previous edition approved in 2007 as D5748-95 (2007). pp. 1-4.

ASTM D 1895-96; Standard Test Methods for Apparent Density, Bulk Factor, and Pourability of Plastic Materials; Copyright ASTM International; Current edition approved Apr. 10, 1996. Published Jul. 1996. Originally published as D 1895-61. Last previous edition D1895-89 (1990); pp. 1-5.

ASTM D6474-99 (Reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D6645-01 (Reapproved 2010); Standard Test Method for Methyl (Comonomer) Content in Polyethylene by Infrared Spectrophotometry; Copyright ASTM International; Current edition approved Jan. 1, 2010. Published Jan. 2010. Originally approved in 2001. Last previous edition approved in 2001 as D6645-01. pp. 1-4.

ASTM D 1238-04; Standard Test Method for Melt Flow Rates of Thermoplastics by Extrusion Plastometer; Copyright ASTM International; Current edition approve Mar. 1, 2004. Published Apr. 2004. Originally approved in 1965. Last previous edition approved in 2001 as D1238-01. pp. 1-13.

ASTM D 1709-04; Standard Test Methods for Impact Resistance of Plastic Film by the Free-Falling Dart Method; Copyright ASTM International; Current edition approved Oct. 1, 2004. Published Oct. 2004. Originally approved in 1959. Last previous edition approved in 2003 as D 1709-03. pp. 1-9.

ASTM D1003-07; Standard Test Method for Haze and Luminous Transmittance of Transparent Plastics; Copyright ASTM International; Current edition approved Nov. 1, 2007. Published Nov. 2007. Originally approved in 1949. Last previous edition approved in 2000 as D1003-00. pp. 1-7.

ASTM D1922-09; Standard Test Method for Propagation Tear Resistance of Plastic Film and Thin Sheeting by Pendulum Method; Copyright ASTM International; Current edition approved May 1, 2009. Published Jun. 2009. Originally approved in 1961. Last previous edition approved in 2008 as D1922-08. pp. 1-7.

ASTM D792-13; Standard Test Methods for Density and Specific Gravity (Relative Density) of plastic by Displacement; Copyright ASTM International; Current edition approved Nov. 1, 2013. Published Nov. 2013. Originally approved in 1944. Last previous edition approved in 2008 as D792-08. pp. 1-6.

ASTM D1003-13; Standard Test Method for Haze and Luminous Transmittance of Transparent Plastics; Copyright ASTM International; Current edition approved Nov. 15, 2013. Published Nov. 2013. Originally approved in 1949. Last previous edition approved in 2011 as D1003-11. pp. 1-7.

ASTM D2457-13; Standard Test Method for Specular Gloss of Plastic Films and Solid Plastics; Copyright ASTM International; current edition approved Apr. 1, 2013. Published Apr. 2013. Originally approved in 1965. Last previous edition approved in 2008 as D2457-08. pp. 1-6.

ASTM D5227-13; Standard Test Method for Measurement of Hexane Extractable Content of Polyolefins; Copyright ASTM International; Current edition approved Jun. 1, 2013. Published Jul. 2013. Originally approved in 1992. Last previous edition approved in 2008 as D5227-01 (2008). pp. 1-4.

ASTM D638-14; Standard Test Method for Tensile Properties of Plastics; Copyright ASTM International; Current edition approved Dec. 15, 2014. Published Mar. 2015. Originally approved in 1941. Last previous edition approved in 2010 as D638-10. pp. 1-17.

* cited by examiner

GPC-FTIR of Inventive Ethylene Copolymer 1

GPC-FTIR of Inventive Ethylene Copolymer 2

GPC-FTIR of Comparative Ethylene Copolymer A

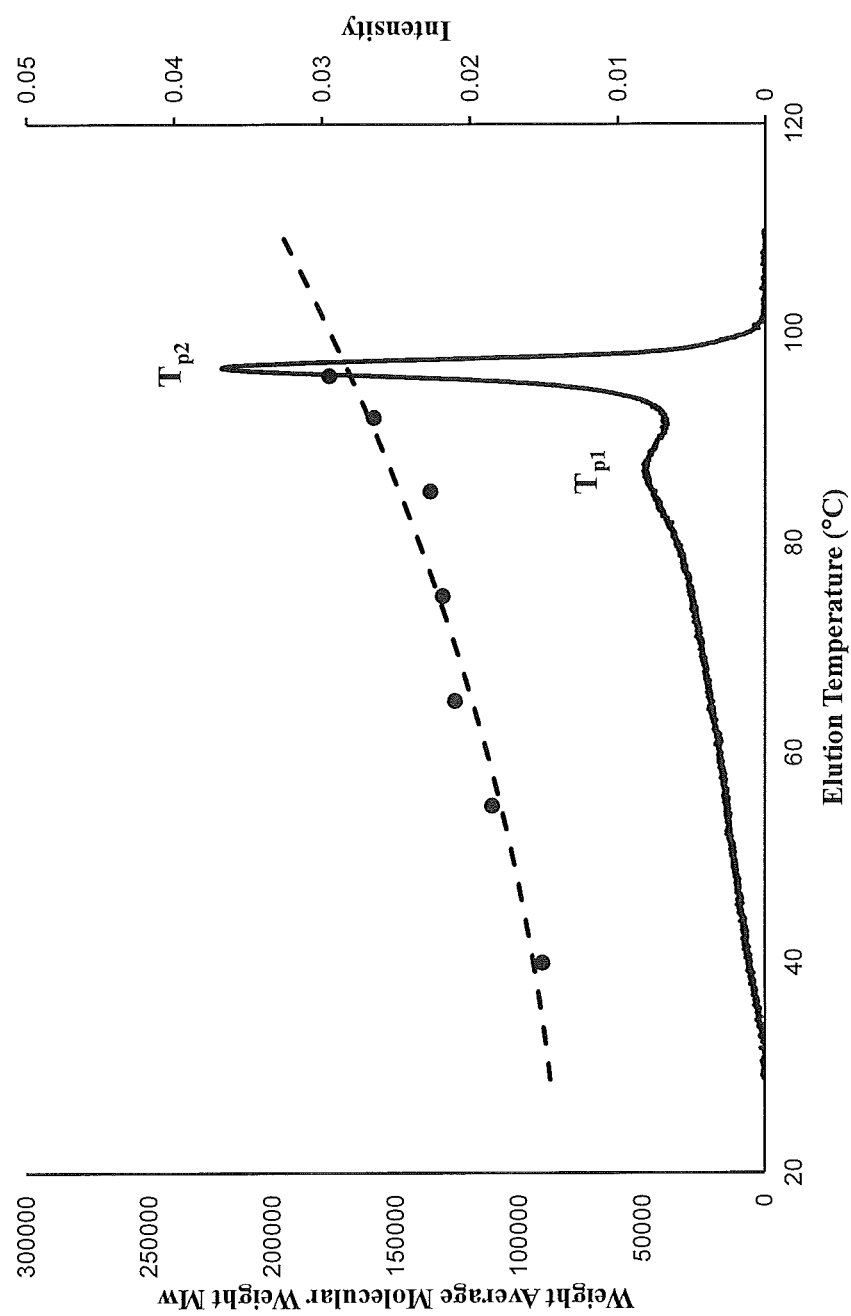

CFC of Inventive Ethylene Copolymer 2

CFC of Comparative Ethylene Copolymer A

ETHYLENE COPOLYMER HAVING ENHANCED FILM PROPERTIES

FIELD OF THIS DISCLOSURE

The present disclosure is directed to the preparation of polyethylene copolymers and the films made from them. A Ziegler-Natta catalyst, one having as an internal electron donor, a trialkylamine molecule, is used to make the ethylene copolymers which have a relatively narrow molecular weight distribution. The ethylene copolymers have improved bulk density and provide good dart impact properties when blown into film at a relatively low blow up ratio.

BACKGROUND

In the gas phase, traditional Ziegler-Natta catalysts tend to produce ethylene copolymers having relatively broad molecular weight distributions as well as broad and uneven comonomer distribution. Typically, an uneven comonomer distribution is demonstrated using analytical techniques which show that as the molecular weight of a polymer chain increases, the amount of side chain branching present in the chain decreases. Single site catalysts, on the other hand can produce ethylene copolymers having narrower molecular weights and a more even comonomer distribution among polymer chains of varying length.

It has been shown that the use of trimethylaluminum rather than triethylaluminum as a cocatalyst in combination with a titanium based Ziegler-Natta catalyst can produce ethylene copolymers with reduced values of melt flow ratio (see for example U.S. Pat. Nos. 4,888,318; 5,055,533; and Re 33,683).

Changes in the formulation of Ziegler-Natta catalysts, such as the nature of an internal or external electron donor molecule has allowed for the production of ethylene copolymers with good bulk density and improved performance in film applications, such as improved tear strength, dart impact strength, and optical properties (see for example U.S. Pat. Nos. 5,139,986; 7,893,180; 6,191,239; and 6,228,792).

In some cases, an external electron donor can alter the melting point of an ethylene/1-hexene copolymer made with a Ziegler-Natta catalyst (see U.S. Pat. No. 6,417,301).

Other manipulations of an internal electron donor can cause some Ziegler-Natta catalysts to have a different response to the presence of hydrogen as disclosed in U.S. Pat. No. 7,671,149.

Changes in the amount of co-catalyst fed to a reactor along with a Ziegler-Natta catalyst can also lead to ethylene/1-hexene copolymers having improved dart impact properties and reduced hexane extractables (see U.S. Pat. No. 6,825,293).

Differences in the order of addition of the various Ziegler-Natta catalyst components during synthesis can have a positive impact on the resulting polyethylene copolymer properties as discussed in U.S. Pat. No. 7,211,535.

Various iterations of the Ziegler-Natta catalyst have led to ethylene copolymer compositions having not only reduced melt flow ratios, but also to compositions having a more even comonomer distribution. For example, in U.S. Pat. Nos. 7,651,969, 8,993,693, and 9,487,608, a titanium based Zielger-Natta catalyst having an internal 2,6-lutidine electron donor molecule provides ethylene/1-hexene copolymers having a relatively narrow molecular weight distribution and a "single site catalyst" like comonomer distribution. These resins exhibit a good balance of tear and impact properties when made into film.

The present disclosure provides ethylene copolymers having intermediate molecular weight distributions and intermediate comonomer distributions relative to resins made with traditional Ziegler-Natta catalysts and single site catalysts. The resins show advantages associated with products which arise from both of these catalyst types.

SUMMARY

Provided in an embodiment of the disclosure is an ethylene copolymer comprising ethylene and an alpha olefin having 3-8 carbon atoms, the ethylene copolymer having a density of from 0.912 g/cm$^3$ to 0.925 g/cm$^3$, a melt index ($I_2$) of from 0.1 g/10 min to 5.0 g/10 min, a melt flow ratio ($I_{21}/I_2$) of from 20 to 30, and a normal comonomer distribution profile in a GPC-FTIR analysis, wherein the normal comonomer distribution profile has a slope of from −3.5 to −7.5, having dimensions of [(SCB/1000C)/Daltons], where the slope is defined as the number of short chain branches per 1000 carbons at a molecular weight of 300,000 minus the number of short chain branches per 1000 carbons at a molecular weight of 30,000.

One embodiment of the disclosure provides an ethylene copolymer having a characteristic composition distribution parameter, $\beta_{Tp1}$ which satisfies the relationship: $\beta_{Tp1} \leq 22750 - 1400 \, (SCB/1000C - 2.5 \times I_2)$.

One embodiment of the disclosure provides an ethylene copolymer having a characteristic composition transition parameter, $\phi_{Tp1 \rightarrow Tp2}$ which satisfies the relationship: $\phi_{Tp1 \rightarrow Tp2} \leq 4230 - 140 \, [SCB/1000C + 0.5 \times (I_{21}/I_2) - 2 \times I_2]$.

One embodiment of the disclosure provides an ethylene copolymer having a molecular weight distribution ($M_w/M_n$) of from 2.5 to 4.0.

One embodiment of the disclosure provides an ethylene copolymer having a multimodal profile in a TREF analysis, the multimodal profile comprising two intensity maxima occurring at elution temperatures Tp1 and Tp2, wherein Tp1 is between 80° C. and 90° C. and Tp2 is between 90° C. and 100° C.

One embodiment of the disclosure provides an ethylene copolymer in which less than 0.5 wt % of the copolymer elutes at a temperature of above 100° C. in a TREF analysis.

One embodiment of the disclosure provides an ethylene copolymer comprising ethylene and 1-hexene.

One embodiment of the disclosure provides an ethylene copolymer having a CDBI$_{50}$ of from 20 wt % to 40 wt %.

One embodiment of the disclosure provides an ethylene copolymer having a melt index ($I_2$) of from 0.2 to 2.0 g/10 min.

In an embodiment of the disclosure, an ethylene copolymer when made into a blown film having a 0.8 mil thickness at a die gap of 85 mil and a blow up ratio (BUR) of 2:1 has a dart impact of greater than 350 g/mil.

In an embodiment of the disclosure, an ethylene copolymer is made with a Ziegler-Natta catalyst.

In an embodiment of the disclosure, an ethylene copolymer is made with a Ziegler-Natta catalyst in a gas phase polymerization process.

One embodiment of the disclosure provides an ethylene copolymer made with a Ziegler-Natta catalyst comprising:

a) a calcined silica support;

b) a first aluminum compound having the formula $Al^1R_b(OR)_aX_{3-(a+b)}$, wherein a+b=3 and b≥1, R is a $C_{1-10}$ alkyl radical, and X is a chlorine atom;

c) a magnesium compound having the formula $Mg(R^5)_2$ where each $R^5$ is independently selected from the group consisting of $C_{1-8}$ alkyl radicals;

d) a reactive organic halide selected from the group consisting of $CCl_4$ and $C_{3-6}$ secondary and tertiary alkyl chlorides or a mixture thereof;

e) a titanium compound having the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom;

f) an electron donor wherein the electron donor is a trialkylamine compound; and g) a second aluminum compound having the formula $Al^2 R_b (OR)_a X_{3-(a+b)}$, wherein a+b=3 and b≥1, R is a $C_{1-10}$ alkyl radical, and X is a chlorine atom.

In an embodiment of the disclosure an ethylene copolymer has a normal comonomer distribution profile with a slope of from −3.5 to −7.5, where the slope is defined as the number of short chain branches per 1000 carbons at a molecular weight of 300,000 minus the number of short chain branches per 1000 carbons at a molecular weight of 30,000.

In an embodiment of the disclosure an ethylene copolymer has a bulk density of greater than 25 lbs/ft³.

In an embodiment of the disclosure, a blown film has a dart impact of ≥350 g/mil when the film has a thickness of 0.8 mil and is made at a die gap of 85 mil and a blow up ratio (BUR) of 2:1.

In an embodiment of the disclosure a blown film has a machine direction tear of ≥400 g/mil when the film has a thickness of 0.8 mil and is made at a die gap of 85 mil and a blow-up ratio (BUR) of 2:1.

Provided in an embodiment of the disclosure is an ethylene copolymer comprising ethylene and an alpha olefin having 3-8 carbon atoms, the ethylene copolymer having a density of from 0.912 g/cm³ to 0.925 g/cm³, a melt index ($I_2$) of from 0.1 g/10 min to 5.0 g/10 min, a melt flow ratio ($I_{21}/I_2$) of from 20 to 30, a normal comonomer distribution profile in a GPC-FTIR analysis, and a characteristic composition distribution parameter, $\beta_{Tp1}$ which satisfies the relationship: $\beta_{Tp1} \leq 22750-1400 \ (SCB/1000C-2.5 \times I_2)$.

Provided in an embodiment of the disclosure is an ethylene copolymer comprising ethylene and an alpha olefin having 3-8 carbon atoms, the ethylene copolymer having a density of from 0.912 g/cm³ to 0.925 g/cm³, a melt index ($I_2$) of from 0.1 g/10 min to 5.0 g/10 min, a melt flow ratio ($I_{21}/I_2$) of from 20 to 30, a normal comonomer distribution profile in a GPC-FTIR analysis, and a characteristic composition transition parameter, $\phi_{Tp1 \to Tp2}$ which satisfies the relationship: $\phi_{Tp1 \to Tp2} \leq 4230-140 \ [SCB/1000C+0.5\times(I_{21}/I_2)-2\times I_2]$.

BRIEF DESCRIPTION OF THE DRAWINGS

FIGS. 2A, 2B and 2C show the cross-fractionation chromatography (CFC) analysis of inventive ethylene copolymer 1, inventive ethylene copolymer 2 and comparative ethylene copolymer A respectively.

DETAILED DESCRIPTION OF THE PREFERRED EMBODIMENTS

Figure 1A:
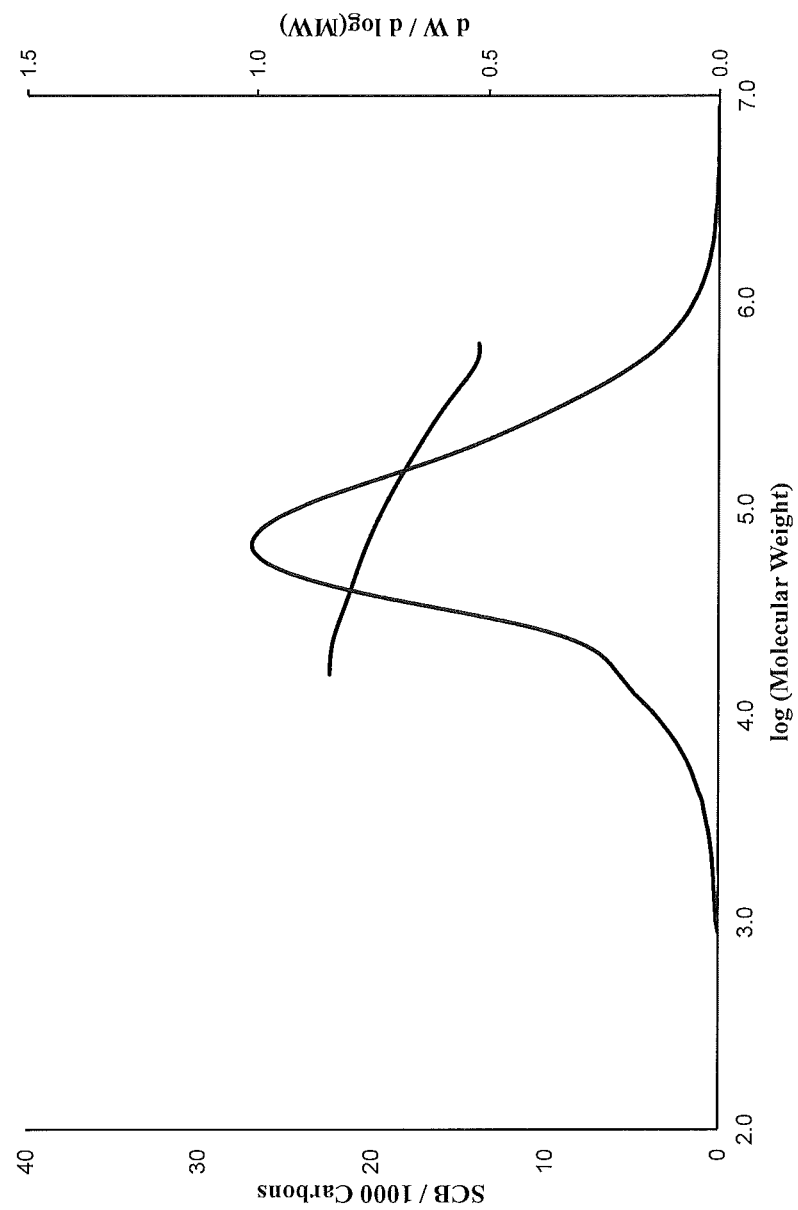
FIG. 1A shows a gel permeation chromatograph with Fourier transform infra-red (GPC-FTIR) detection obtained for an ethylene copolymer made according to the present disclosure. The comonomer content, shown as the number of short chain branches per 1000 carbons (left y-axis), is given relative to the copolymer molecular weight (x-axis). The conventional GPC weight fraction, (dW/d log(MW), is shown (right y-axis) The downwardly sloping line (from left to right) is the short chain branching (in short chain branches per 1000 carbons atoms) determined by FTIR. As can be seen in the Figure, the number of short chain branches decreases at higher molecular weights, and hence the comonomer incorporation is said to be "normal".

The present disclosure concerns the production of ethylene copolymers in the gas phase using a Ziegler-Natta catalyst. The Ziegler-Natta catalyst is formulated with a specific type of internal electron donor compound.

Polymerization Catalyst

The polymerization catalyst used in the present disclosure is a Ziegler-Natta type catalyst.

In the present disclosure, the Ziegler-Natta catalyst comprises: (a) an inorganic oxide support; (b) a first aluminum compound (to chemically treat the surface of the inorganic oxide support); (c) a magnesium compound; (d) a halide donor (to precipitate magnesium halide on reaction with the magnesium compound); (e) a titanium compound; (f) an electron donor compound; and (g) a second aluminum compound (to serve as a catalyst reductant).

The first aluminum compound is added to the inorganic oxide support to chemically treat it. The second aluminum compound is added at some point during the manufacture of the Ziegler-Natta catalyst and serves as a reductant.

The inorganic oxide support used for the Ziegler-Natta catalysts may, in the present disclosure, comprise an inorganic oxide selected from an alumina or a silica material and will have pendant reactive moieties. For example, the reactive moieties may be a silanol group or siloxane bridges.

In an embodiment of the disclosure, the inorganic oxide support used in the synthesis of the Ziegler-Natta catalyst is silica.

In embodiments of the disclosure, the silica support has an average particle size from about 0.1 to about 150 microns, or from about 10 to about 150 microns, or about 20 to 100 microns.

In embodiments of the disclosure, the silica support has a surface area which is greater than about 100 m$^2$/g, or greater than about 250 m$^2$/g, or from about 300 m$^2$/g to about 800 m$^2$/g.

In embodiments of the disclosure, the silica support has a pore volume from about 0.5 to about 5.0 ml/g, or from about 0.7 to about 3.0 ml/g.

Silica supports suitable for use in an embodiment of the present disclosure have a high surface area and are amorphous. Suitable non-limiting examples of such silica supports include commercially available silicas marketed under the trademark of Sylopol® 958, 955 and 2408 by Davison Catalysts a Division of W. R. Grace and Company and ES-70W by Ineos Silica.

The inorganic oxide support can be heat treated and/or chemically treated to reduce the level of surface hydroxyl (OH) groups and absorbed water in a similar fashion to that described by A. Noshay and F. J. Karol in *Transition Metal Catalyzed Polymerizations*, Ed. R. Quirk, 1989, pg. 396.

In an embodiment of the disclosure, the inorganic oxide support is heat treated or "dried" prior to chemical treatment. Drying a support is also known as "calcining" a support.

The inorganic support may be dried or calcined by heating it to a temperature of at least about 200° C. for up to 24 hours, or to a temperature of from about 500° C. to about 800° C. for about 2 to 20 hours, or for about 4 to 10 hours. The resulting support may in an embodiment of the disclosure be free of adsorbed water and have a surface hydroxyl content of from about 0.1 to about 5 mmol/g, or from about 0.5 to about 3 mmol/g (where mmol is mmol of OH, and g is gram of support).

The amount of hydroxyl groups present in silica support may be determined according to the method disclosed by J. B. Peri and A. L. Hensley, Jr., in *J. Phys. Chem.*, 72 (8), 2926, 1968, the entire contents of which are incorporated herein by reference.

While heating (e.g. "calcining") is one of the methods that may be used to remove or reduce OH groups present in an inorganic support material, such as for example silica, the OH groups may also be removed or reduced by chemical means. For example, a desired proportion of the OH groups present in an inorganic support may be reacted with a suitable chemical agent, such as a hydroxyl reactive alkyl-aluminum compound (e.g. triethyl aluminum) or a silane compound. This method of treatment has been disclosed in the literature and for two relevant examples see: U.S. Pat. No. 4,719,193 in 1988 and by Noshay A. and Karol F. J. in *Transition Metal Catalyzed Polymerizations*, Ed. R. Quirk, 396, 1989.

Chemical treatment may in an embodiment of the disclosure involve treatment of an inorganic oxide support with a first aluminum compound.

In an embodiment of the disclosure, an inorganic oxide support is treated with a first aluminum compound having the formula Al$^1$R$_b$(OR)$_a$X$_{3-(a+b)}$, wherein a+b=3 and b≥1, R is a C$_{1-10}$ alkyl radical, and X is a chlorine atom.

In an embodiment of the disclosure, the first aluminum compound is selected from the group consisting of trimethyl aluminum (TMA), triethyl aluminum (TEAL), diethyl aluminum ethoxide, diisobutyl aluminum ethoxide, tri-isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof.

In an embodiment of the disclosure, the magnesium compound used in the formulation of the Ziegler-Nata catalyst has the formula (R$^5$)$_e$MgX$_{2-e}$ wherein each R$^5$ is independently a C$_{1-20}$ hydrocarbyl group, e is 1 or 2; and X is a halide.

The magnesium compound is combined with a halide donor to form a magnesium halide composition as part of the Ziegler-Natta catalyst.

Some commercially available magnesium compounds which may be used in an embodiment of the disclosure include butyl octyl magnesium, dibutyl magnesium, diphenyl magnesium, ditolyl magnesium, dibenzyl magnesium, diisopropyl magnesium, dihexyl magnesium, diethyl magnesium, propyl butyl magnesium, and butyl ethyl magnesium.

In an embodiment of the disclosure, the magnesium compound used in the formulation of the Ziegler-Nata catalyst has the formula Mg(R$^5$)$_2$ wherein each R$^5$ is independently a C$_{1-20}$ hydrocarbyl group.

In an embodiment of the disclosure, the magnesium compound used in the formulation of the Ziegler-Nata catalyst has the formula Mg(R$^5$)$_2$ wherein each R$^5$ is independently a C$_{1-8}$ alkyl group.

In cases where the magnesium compound is not readily soluble in the diluents of choice for the catalyst preparation, it may be desirable to add a solubilizing compound such as an organoaluminum or organozinc compound prior to use. Such compounds are discussed in, for example, U.S. Pat. Nos. 4,127,507 and 4,250,288. Alternatively, where magnesium compounds provide solutions which are overly viscous in diluents of choice, solubilizers such as organoaluminum or organozinc may be used to decrease the viscosity of the solution.

In an embodiment of the disclosure, the magnesium compound used has been treated with a solubilizing agent (or viscosity improving agent) and is formulated as a solution in a suitable hydrocarbon solvent. Such magnesium compound containing solutions are commercially available from suppliers such as Albermarle, Akzo Nobel, etc. For example, magnesium compounds available in hydrocarbon solution include solutions of butylethylmagnesium or dibutylmagnesium which have been treated with an organoaluminum compound to improve solubility and/or reduce solution viscosity.

The halide donor is not specifically defined and can be any suitable halide source compound which is capable of providing an active (i.e. reactive) halide ion for reaction with an organomagensium bond in the magnesium compound. Preferably the halide donor will react spontaneously and fully with the magnesium compound, but a halide donor which requires a transfer agent such as described in U.S. Pat. No. 6,031,056 is also contemplated for use.

In an embodiment of the disclosure, the halide donor is a protic halide HX, or a reactive organic halide selected from the group consisting of CCl$_4$ and C$_{1-10}$ primary, secondary or tertiary alkyl halides, and mixture thereof.

In an embodiment of the disclosure, the halide donor is CCl$_4$ or one or more secondary or tertiary chlorides having the formula R$^6$Cl wherein R$^6$ is selected from the group consisting of C$_{3-12}$ secondary and tertiary alkyl radicals.

In an embodiment of the disclosure, the halide donor is a reactive organic halide selected from the group consisting of CCl$_4$ and C$_{3-6}$ secondary and tertiary alkyl chlorides or a mixture thereof.

In an embodiment of the disclosure, the halide donor is selected from the group comprising sec-butyl chloride, tert-butyl chloride and sec-propyl chloride.

In an embodiment of the disclosure the halide donor is tert-butyl chloride, (t-BuCl).

In an embodiment of the disclosure, the titanium compound used in the formulation of the Ziegler-Natta catalyst has the formula $Ti(OR^2)_cX_d$ where $R^2$ is selected from the group consisting of a $C_{1-20}$ alkyl radical, and a $C_{6-10}$ aromatic radical, X is selected from the group consisting of a chlorine atom and a bromine atom, c is 0 or an integer up to 4, and d is 0 or an integer up to 4, and the sum of c+d is the valence of the Ti atom.

In an embodiment of the disclosure, the titanium compound is selected from the group consisting of $TiCl_3$, $TiCl_4$, $Ti(OC_4H_9)_4$, $Ti(OC_3H_7)_4$, $Ti(OC_4H_9)Cl_3$, $Ti(OCOCH_3)Cl_3$, $Ti(OCOC_6H_5)Cl_3$ and mixtures thereof.

In an embodiment of the disclosure, the titanium compound is selected from the group consisting of Ti(O-tert-butyl)$_4$ (i.e. $Ti(OC_4H_9)_4$), $TiCl_4$ and mixtures thereof.

In an embodiment of the disclosure, the titanium compound is titanium tetrachloride, $TiCl_4$.

The Ziegler-Natta catalyst of the present disclosure will additionally comprise an electron donor molecule.

In an embodiment of the disclosure, the electron donor molecule will be an amine compound.

In an embodiment of the disclosure, the electron donor molecule will be an amine compound, $R^8{}_3N$, where each $R^8$ is independently a $C_{1-30}$ hydrocarbyl group.

In an embodiment of the disclosure, the electron donor molecule will be a trialkyl amine compound.

In an embodiment of the disclosure, the electron donor molecule will be a trialkyl amine compound, $R^8{}_3N$ where each $R^8$ is independently a $C_{1-30}$ alkyl group.

In an embodiment of the disclosure, the electron donor molecule will be a trialkyl amine compound, $R^8{}_3N$, where $R^8$ is a $C_{1-20}$ primary alkyl group.

In an embodiment of the disclosure, the electron donor molecule may be selected from the group consisting of trimethylamine ($Me_3N$), tri-iso-propylamine ($iPr_3N$), tri-n-propylamine ($nPr_3N$), triethylamine ($Et_3N$), and mixtures thereof.

In an embodiment of the disclosure, the electron donor molecule will be triethylamine, $Et_3N$.

The second aluminum compound will in an embodiment of the disclosure have the formula $Al^2R_b(OR)_aX_{3-(a+b)}$, wherein a+b=3 and b≥1, R is a $C_{1-10}$ alkyl radical, and X is a chlorine atom.

The first and second aluminum compounds may be the same or different.

In an embodiment of the disclosure, the second aluminum compound is selected from the group consisting of trimethyl aluminum (TMA), triethyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof.

In an embodiment of the disclosure, the amount of the first aluminum compound added to an inorganic oxide support is such that the amount of aluminum ($Al^1$) on the support prior to adding other Ziegler-Natta catalyst components will be from about 0.5 to about 2.5 weight %, or from about 1.0 to about 2.0 wt % based on the weight of the inorganic oxide support.

In embodiments of the disclosure the halide donor is added in a quantity such that the molar ratio of active halide (e.g. chloride from a reactive organic halide) to magnesium, X:Mg will be from about 1.2:1 to about 6:1, or from about 1.5:1 to about 6:1, or from about 1.5:1 to about 5:1, or from about 1.5:1 to about 3:1, or from about 1.9:1 to about 3:1, or from about 1.9:1 to about 2.2:1.

In an embodiment of the disclosure, the titanium compound is added in a quantity such that titanium is present in an amount from about 0.20 to about 3 weight %, or from about 0.20 to about 1.5 wt %, or from about 0.25 to about 1.25 wt %, or from about 0.25 to about 1.0 wt %, or from about 0.25 to about 0.70 wt %, or from about 0.35 to about 0.65 wt % (where wt %, is the weight percent of titanium present based on the final weight of the catalyst, including the inorganic oxide support).

In embodiments of the disclosure the molar ratio of magnesium from the magnesium compound to titanium from the titanium compound, Mg:Ti may be from about 0.5:1 to about 50:1, or from about 1:1 to about 20:1, or from about 2:1 to about 15:1, or from about 4:1 to about 15:1, or from about 6:1 to about 15:1, or from about 2:1 to about 12:1, or from about 2:1 to about 10:1, or from about 3:1 to about 10:1.

In embodiments of the disclosure the molar ratio of the electron donor molecule to titanium from the titanium compound, ED:Ti will be from about 0.1:1 to about 18:1, or from about 0.1:1 to about 15:1, or from about 0.5:1 to about 15:1, or from about 1:1 to about 15:1, or from about 2:1 to about 12:1, or from about 3:1 to about 12:1, or from about 3:1 to about 10:1.

In an embodiment of the disclosure the molar ratio of aluminum from the second aluminum compound to titanium from the titanium compound, $Al^2$:Ti will be from about 1:1 to about 8:1, or from about 1.5:1 to about 7:1, or from about 2:1 to 6:1.

In an embodiment of the disclosure the ratio of total aluminum from the first and the second aluminum compounds to titanium from the titanium compound, $Al^1+Al^2$:Ti will be from about 1:1 to about 15:1, or from about 2:1 to about 15:1, or from about 2:1 to about 12:1, or from about 3:1 to about 10:1.

In embodiments of the disclosure, from about 10 to about 85 weight %, or from about 30 to about 80 weight %, or from about 50 to 75 weight % of the total aluminum present in the Ziegler-Natta catalyst is used to chemically treat the inorganic oxide support.

In embodiments of the disclosure, the ratio of total aluminum from the first and the second aluminum compounds to magnesium from the magnesium compound, $Al^1+Al^2$:Mg will be from about 1:0.1 to about 1:3, or from about 1:0.35 to about 1:3, or from about 1:0.40 to about 1:3, or from about 1:0.40 to about 1:2.

The Ziegler-Natta catalyst components (a)-(f) may be combined in a hydrocarbon solvent or diluent such as an inert $C_{5-10}$ hydrocarbon that may be unsubstituted or is substituted by a $C_{1-4}$ alkyl radical. Suitable inert hydrocarbons include pentane, isopentane, n-hexane, various isomeric hexanes, heptane, octane, isooctane, cyclohexane, methyl cyclohexane, dimethyl cyclohexane, dodecane, hydrogenated naphtha and ISOPAR® E (a solvent available from Exxon Chemical Company) and mixtures thereof.

In an embodiment of the disclosure a Ziegler-Natta catalyst is prepared by carrying out the following steps in a hydrocarbon solvent or diluent at a temperature from 0° C. to 100° C.:

a) contacting a calcined silica support with a first aluminum compound having the formula $Al^1R_b(OR)_aX_{3-(a+b)}$, wherein a+b=3 and b≥1, R is a $C_{1-10}$ alkyl radical, and X is a chlorine atom to give a silica support having from 0.5 to 2.5 weight % of aluminum present;

b) contacting the resulting product with a magnesium compound having the formula $Mg(R^5)_2$ where each $R^5$ is independently selected from the group consisting of $C_{1-8}$ alkyl radicals to provide from 0.25 to 8.0 weight % of Mg based on the weight of the silica support (and where the magnesium compound may contain an aluminum alkyl as a thinning agent);

c) contacting the resulting product with a reactive organic halide selected from the group consisting of $CCl_4$ and $C_{3-6}$ secondary and tertiary alkyl chlorides or a mixture thereof to provide a Cl:Mg molar ratio from 1.5:1 to 5:1;

d) contacting the resulting product with a titanium compound having the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, c is 0 or an integer up to 4, and d is 0 or an integer up to 4, and the sum of c+d is the valence of the Ti atom, to provide from 0.20 to 3 weight % of Ti based on the weight of the final catalyst;

e) contacting the resulting product with an electron donor in an ED:Ti ratio from 0.1:1 to 18:1, where the electron donor is an amine compound, $R^8{}_3N$, where each $R^8$ is independently a $C_{1-30}$ hydrocarbyl group;

f) contacting the resulting product with a second aluminum compound having the formula $Al^2R_b(OR)_a X_{3-(a+b)}$, wherein a+b=3 and b≥1, R is a $C_{1-10}$ alkyl radical, and X is a chlorine atom, to provide a molar ratio of $Al^2$:Ti of from 1:1 to 8:1.

In the present disclosure, the order of addition of the titanium compound, the electron donor, and the second aluminum compound is not essential and may be varied in an attempt to maximize the productivity of the Ziegler-Natta catalyst.

In the present disclosure, the Ziegler-Natta catalyst is used in combination with one or more than one co-catalyst.

In an embodiment of the disclosure, the co-catalyst has the formula $Al^3R_b(OR)_a X_{3-(a+b)}$, wherein a+b=3 and b≥1, R is a $C_{1-20}$ hydrocarbyl group, and X is a halide.

In an embodiment of the disclosure, the co-catalyst is selected from the group consisting of trialkyl aluminums, alkyl aluminum chlorides, and mixtures thereof, non-limiting examples of which include triethyl aluminum, tri-n-propyl aluminum, tri-iso-propyl aluminum, tri-n-butyl aluminum, tri-iso-butyl aluminum, tri-n-hexyl aluminum, diethyl aluminum chloride, diethyl aluminum ethoxide, di-n-butyl aluminum chloride, and mixtures thereof In an embodiment of the disclosure, the co-catalyst is triethyl aluminum.

In an embodiment of the disclosure, the co-catalyst is tri-n-hexyl aluminum.

Polymerization Process

The polymerization process used in an embodiment of the present disclosure is a gas phase polymerization process. Generally, a monomer feed comprising at least ethylene and optionally one or more $C_{3-8}$ alpha-olefins is fed to a gas phase fluidized bed reactor or to a stirred bed reactor. In both the fluidized bed and stirred bed the polymer particles removed from the reactor are degassed to remove any volatile material and the resulting polymer (with entrained catalyst) may then be further treated (e.g. stabilizers added and pelletized if necessary).

A fluidized bed is generally formed by the flow of a gaseous fluid through a bed of particles. The direction of flow is opposite gravity. The frictional drag of the gas on the solid particles overcomes the force of gravity and suspends the particles in a fluidized state referred to as the fluidized bed. To maintain the particles in a fluidized state, the superficial gas velocity through the bed must exceed the minimum flow required for fluidization.

Generally, then, a conventional fluidized bed polymerization process for producing ethylene copolymers (or other types of polymers) is carried out by passing a gaseous stream comprising one or more monomers (e.g. ethylene and one or more alpha olefins) continuously through a fluidized bed reactor in the presence of a catalyst at a velocity sufficient to maintain the bed of solid particles in a suspended condition.

A fluidized bed process is typically a cyclical process in which the fluidizing medium, is heated within the reactor by the heat of the polymerization reaction and then passed from the reactor to a compressor unit and from a compressor unit to a cooling unit. After passing through a compressor unit, the cooled fluidizing medium is returned to the polymerization reactor. Hence, the hot gaseous stream exiting from polymerization reactor and which may contain unreacted monomer is continuously withdrawn from the reactor, compressed, cooled and recycled to the reactor. The product polymer (e.g. an ethylene copolymer) is continuously withdrawn from the reactor while make-up monomers (e.g. ethylene and/or alpha olefin comonomers) are added to the reactor system. The addition of monomers to the reactor system may include addition to the reactor per se or any other part of the reactor system such as anywhere in the recycle stream. Make up monomers are added to replace those monomers consumed during polymerization. Fluidization is achieved by a high rate of fluid recycle to and through the bed, typically on the order of about 50 times the rate of feed or make-up fluid. This high rate of fluid recycle provides the requisite superficial gas velocity needed to maintain the fluidized bed. Typical minimum superficial gas velocities required to maintain fluidization are from about 0.2 to about 0.5 feet/second and so the superficial gas velocity used during polymerization may be from at least 0.2 feet/second above the minimum flow for fluidization or from about 0.4 to about 0.7 feet/second. For examples of a typical fluidized bed reactor and its operation in the polymerization of olefins see U.S. Pat. Nos. 4,543,399; 4,588,790; 5,028,670; 5,317,036; 5,352,749; 5,405,922; 5,436,304; 5,453,471; 5,462,999; 5,616,661; 5,668,228 and 6,689,847.

A fluidized bed reactor generally comprises a reaction zone and a velocity reduction zone. The reactor may comprise a generally cylindrical region beneath an expanded section (the velocity reduction zone or disentrainment zone). The reaction zone includes a bed of growing polymer particles, formed polymer particles and a minor amount of catalyst all fluidized by the continuous flow of polymerizable and modifying gaseous components, including inert components in the form of make-up feed and recycle fluid through the reaction zone.

To ensure complete fluidization, the recycle stream and, where desired, at least part of the make-up stream can be returned through a recycle line to the reactor, at an inlet positioned below the fluidized bed. A fluidized bed reactor has a gas distributor plate above the point of return to aid in the distribution of gaseous medium flow and to uniformly fluidize the bed. The distributer plate is a plate with holes in it to allow the passage of the fluidizing or recycle fluids into the reactor. The distributer plate also supports the solid particles (e.g. seed bed particles) prior to start-up (i.e. before the particles are fluidized) or when the reactor system is shut down. The stream passing upwardly through the bed helps remove the heat of reaction generated by the exothermic polymerization reaction.

Make-up fluids, such as monomers may be fed at a point below the distributor plate via a feed line and/or recycle line. The composition of the recycle stream may be measured by a gas analyzer and the composition and amount of the make-up stream may be adjusted to maintain an essentially steady state composition within the reaction zone. The gas analyzer may be positioned to receive gas from a point between the velocity reduction zone and heat exchanger, or between a compressor and heat exchanger.

The portion of the gaseous stream flowing through the fluidized bed which did not react in the bed becomes the recycle stream which leaves the reaction zone, passes into the velocity reduction zone above the bed where a major portion of the entrained particles drop back onto the bed thereby reducing solid particle carryover, and on to the compressor and heat exchanger system.

The recycle stream is then compressed in a compressor and passed through heat exchanger where the heat of reaction is removed from the recycle stream before it is returned to the bed. Note that the heat exchanger can also be positioned before the compressor. The heat exchanger can be, for example, a shell and tube heat exchanger, with the recycle gas traveling through the tubes.

The recycle stream exiting the heat exchange zone is then returned to the reactor at its base and from there to the fluidized bed by passage through the distributor plate. A deflector may be installed at the inlet to the reactor to prevent contained polymer particles from settling out and agglomerating into a solid mass and to maintain entrained or to re-entrain any particles or liquid which may settle out or become disentrained.

The polymer product is discharged from the reactor using an exit line positioned above the distribution plate. It is desirable to separate any fluid from the product and to return the fluid to the reactor vessel.

In an embodiment of the present disclosure, the polymerization catalyst enters the reactor in solid, slurry or liquid form at a point somewhere above the distributer plate through a catalyst feed line. If one or more co-catalysts are to be added separately from the catalyst, as is sometimes the case, the one or more co-catalysts may be introduced separately into the reaction zone or below the reactor zone or another location in the polymerization reactor system, where they will react with the catalyst to form the catalytically active reaction product and/or affect the reaction proceeding in the reactor system. However, the catalyst and co-catalyst(s) may be mixed prior to their introduction into the reaction zone.

In an embodiment of the disclosure, the Zielger-Natta catalyst is fed to the reactor above a distributor plate into the bed of growing polymer particles using a metering device. One such device is disclosed in U.S. Pat. No. 3,779,712. In an embodiment of the disclosure, the co-catalyst (in neat form or in a solution made with a hydrocarbon solvent) is fed to the reactor at a point below a distributor plate using a metering device.

In an embodiment of the disclosure, the co-catalyst (in neat form or in a solution made with a hydrocarbon solvent) is fed to the reactor at a point above a distributor plate and into the bed of growing polymer particles using a metering device.

The co-catalyst may be fed to the reactor to provide from 10 to 50, preferably 10 to 40, more preferably from 17 to 30, most preferably from 20 to 26 ppm of aluminum (Al ppm) based on the polymer production rate.

In an embodiment of the disclosure, the molar ratio of total aluminum from the co-catalyst and the Ziegler-Natta catalyst to the titanium from the Ziegler-Natta catalyst, $Al^{TOTAL}$:Ti is at least about 25:1.

In an embodiment of the disclosure, the molar ratio of total aluminum from the co-catalyst and the Ziegler-Natta catalyst to the titanium from the Ziegler-Natta catalyst, $Al^{TOTAL}$:Ti is from about 25:1 to about 80:1.

A continuity additive may be added in situ to the reactor system via an appropriate mechanism such as solid, liquid or slurry feed line.

Optionally, the reactor system may include sensors or probes to detect static levels and changes thereof.

The reaction vessel may, by way of non-limiting example, have an inner diameter of at least about 2 feet, and is generally greater than about 10 feet.

The reactor pressure in a gas phase process may vary from about 100 psig (690 kPa) to about 600 psig (4138 kPa), or from about 200 psig (1379 kPa) to about 400 psig (2759 kPa), or from about 250 psig (1724 kPa) to about 350 psig (2414 kPa).

The reactor temperature in a gas phase process may vary from about 30° C. to about 120° C. In embodiments of the disclosure, the reactor temperature is operated at less than about 40° C., or less than about 30° C., or less than about 20° C., or less than about 15° C. below the melting point of the polyolefin being produced. The process can also be run at higher temperatures, such as for example less than about 10° C., or less than about 5° C. below the melting point of the polyolefin being produced. Ethylene copolymers, for example, may have a melting point in the range of approximately 115° C. to 130° C.

The gas phase process may be operated in a condensed mode, where an inert condensable fluid is introduced to the process to help remove the heat of the polymerization reaction. Condensable fluids are sometimes referred to as induced condensing agents or ICA's. For further details of a condensed mode processes see for example U.S. Pat. Nos. 5,342,749 and 5,436,304. An example of a condensable fluid for use with condensed mode operation is n-pentane or isopentane.

In embodiments of the present disclosure, the fluidized bed reactor is capable of producing greater than 500 lbs of polymer per hour (227 Kg/hr) to about 175,000 lbs/hr (80,000 Kg/hr) or higher of polymer. In further embodiments, the reactor utilized is capable of producing greater than 1,000 lbs/hr (455 Kg/hr), or greater than 10,000 lbs/hr (4540 Kg/hr), or greater than 25,000 lbs/hr (11,300 Kg/hr), or greater than 35,000 lbs/hr (15,900 Kg/hr), or greater than 50,000 lbs/hr (22,700 Kg/hr), or greater than 65,000 lbs/hr (29,545 Kg/hr), or greater than 85,000 lbs/hr (38,636 Kg/hr), or greater than 100,000 lbs/hr (45,454 Kg/hr), or greater than 110,000 lbs/hr (50,000 Kg/hr).

On start-up, the reactor is generally charged with a bed of particulate polymer particles (e.g. the seed bed) before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed consisting of desired polymer particles supplants the start-up bed (or "seed bed").

The fluidized bed process described above is well adapted for the preparation of polyethylene from ethylene but other monomers (i.e. comonomers) may also be employed. Monomers and comonomers include ethylene and $C_{3-12}$ alpha olefins respectively, where $C_{3-12}$ alpha olefins are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-tert-butyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In one embodiment, the disclosure is directed toward a polymerization process involving the polymerization of ethylene with one or more of comonomer(s) including linear or branched comonomer(s) having from 3 to 30 carbon atoms, or from 3-12 carbon atoms, or from 3 to 8 carbon atoms.

In embodiments of the disclosure, the comonomer is an alpha-olefin having from 3 to 15 carbon atoms, or from 4 to 12 carbon atoms, or from 4 to 10 carbon atoms, or from 3 to 8 carbon atoms.

In an embodiment of the disclosure, ethylene comprises at least 75 wt % of the total weight of monomer (i.e. ethylene) and comonomer (i.e. alpha olefin) that is fed to a polymerization reactor.

In an embodiment of the disclosure, ethylene comprises at least 85 wt % of the total weight of monomer (i.e. ethylene) and comonomer (i.e. alpha olefin) that is fed to a polymerization reactor.

In an embodiment of the disclosure, ethylene is polymerized with at least two different comonomers to form a terpolymer.

In an embodiment of the disclosure, the comonomer is an alpha-olefin selected from the group comprising 1-butene, 1-pentene, 1-hexene, and 1-octene.

In an embodiment of the disclosure, the comonomer is an alpha-olefin selected from the group comprising 1-butene, 1-hexene, and 1-octene.

In an embodiment of the disclosure, the comonomer is 1-hexene.

The Ethylene Copolymer

In the present disclosure, the term "ethylene copolymer" is used interchangeably with the term "polyethylene copolymer" and each connote a polymer consisting of polymerized ethylene units and at least one type of polymerized alpha olefin.

In an embodiment of the disclosure, the ethylene copolymer compositions are copolymers of ethylene and an alpha olefin having from 3 to 8 carbon atoms.

In an embodiment of the disclosure, the ethylene copolymer compositions are copolymers of ethylene and an alpha olefin selected from 1-butene, 1-hexene and 1-octene.

In an embodiment of the disclosure, the ethylene copolymer compositions are copolymers of ethylene and 1-hexene.

In embodiments of the disclosure, the ethylene copolymer composition will comprise at least about 75 weight % of ethylene units, or at least about 80 wt % of ethylene units, or at least about 85 wt % of ethylene units with the balance being an alpha-olefin unit, based on the weight of the ethylene copolymer composition.

The short chain branching (SCB) in an ethylene copolymer is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. Generally, the short chain branching is quantified per 1000 carbon atoms (i.e. SCB/1000Cs) in an ethylene copolymer chain using methods such as for example by $^{13}C$ NMR, or FTIR or GPC-FTIR methods.

In embodiments of the disclosure, the ethylene copolymer will have a density of from 0.910 g/cm$^3$ to 0.936 g/cm$^3$ including narrower ranges within this range, such as for example, from 0.912 g/cm$^3$ to 0.936 g/cm$^3$, or from 0.910 g/cm$^3$ to 0.934 g/cm$^3$, or from 0.912 g/cm$^3$ to 0.934 g/cm$^3$, or from 0.910 g/cm$^3$ to 0.932 g/cm$^3$, or from 0.910 g/cm$^3$ to 0.930 g/cm$^3$, or from 0.910 g/cm$^3$ to 0.929 g/cm$^3$, or from 0.912 g/cm$^3$ to 0.929 g/cm$^3$, or from 0.910 g/cm$^3$ to 0.927 g/cm$^3$, or from 0.910 g/cm$^3$ to 0.925 g/cm$^3$, or from 0.912 g/cm$^3$ to 0.925 g/cm$^3$, or from 0.914 g/cm$^3$ to 0.925 g/cm$^3$, or from 0.914 g/cm$^3$ to 0.923 g/cm$^3$, or from 0.914 g/cm$^3$ to 0.921 g/cm$^3$, or from 0.914 g/cm$^3$ to 0.919 g/cm$^3$, or from 0.914 g/cm$^3$ to 0.936 g/cm$^3$, or from 0.914 g/cm$^3$ to 0.934 g/cm$^3$, or from 0.914 g/cm$^3$ to 0.932 g/cm$^3$, or from 0.914 g/cm$^3$ to 0.930 g/cm$^3$, or from 0.914 g/cm$^3$ to 0.929 g/cm$^3$.

In embodiments of the disclosure, the ethylene copolymer will have a melt index ($I_2$) of from about 0.1 to about 5.0 g/10 min, or from about 0.1 to about 4.5 g/10 min, or from about 0.1 to about 4.0 g/10 min, or from about 0.2 to about 5.0 g/10 min, or from about 0.3 to about 5.0 g/10 min, or from about 0.4 to about 5.0 g/10 min, or from about 0.5 to about 5.0 g/10 min, or from about 0.5 to about 4.5 g/10 min, or from about 0.5 to about 4.0 g/10 min, or from about 0.5 to about 3.5 g/10 min, or from about 0.5 to about 3.0 g/10 min, or from about 0.1 to about 2.5 g/10 min, or from about 0.1 to about 2.0 g/10 min, or from about 0.1 to about 1.5 g/10 min, or from about 0.1 to about 1.0 g/10 min, or from about 0.2 to about 3.0 g/10 min, or from about 0.2 to about 2.5 g/10 min, or from about 0.2 to about 2.0 g/10 min.

In an embodiment of the disclosure, the ethylene copolymer will have a melt flow ratio (the MFR=$I_{21}/I_2$) of from about 18 to about 36, or from about 18 to about 34, or from about 20 to about 32, or from about 20 to about 30, or from about 20 to about 28, or from about 22 to about 30, or from about 22 to about 28, or from about 21 to about 29, or from about 22 to about 29, or from about 23 to about 29, or from about 23 to about 28, or from about 23 to about 27, or from about 22 to about 27, or from about 24 to about 27.

The ethylene copolymer of the present disclosure may have a unimodal, broad unimodal, bimodal, or multimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the disclosure, the ethylene copolymer will have a unimodal profile in a gel permeation chromatography (GPC) curve generated according to the method of ASTM D6474-99.

In embodiments of the disclosure, the ethylene copolymer will exhibit a weight average molecular weight ($M_w$) as determined by gel permeation chromatography (GPC) of from about 25,000 to about 250,000, including narrower ranges within this range, such as for example, from about 30,000 to about 225,000, or from about 50,000 to about 200,000, or from about 50,000 to about 175,000, or from about 75,000 to about 150,000, or from about 80,000 to about 130,000.

In embodiments of the disclosure, the ethylene copolymer will exhibit a number average molecular weight ($M_n$) as determined by gel permeation chromatography (GPC) of from about 5,000 to about 100,000 including narrower ranges within this range, such as for example from about 7,500 to about 100,000, or from about 7,500 to about 75,000, or from about 7,500 to about 50,000, or from about 10,000 to about 100,000, or from about 10,000 to about 75,000, or from about 10,000 to about 50,000.

In embodiments of the disclosure, the ethylene copolymer will exhibit a Z-average molecular weight ($M_Z$) as determined by gel permeation chromatography (GPC) of from about 50,000 to about 1,000,000 including narrower ranges within this range, such as for example from about 75,000 to about 750,000, or from about 100,000 to about 500,000, or from about 100,000 to about 400,000, or from about 125,000 to about 375,000, or from about 150,000 to about 350,000, or from about 175,000 to about 375,000, or from about 175,000 to about 400,000, or from about 200,000 to about 400,000 or from about 225,000 to about 375,000.

In embodiments of the disclosure, the ethylene copolymer will have a molecular weight distribution ($M_w/M_n$) as determined by gel permeation chromatography (GPC) of from about 2.0 to about 6.0, including narrower ranges within this range, such as for example, from about 2.2 to about 5.5, or from about 2.2 to about 5.0, or from about 2.2 to about 4.5, or from about 2.2 to about 4.0, or from about 2.4 to about 5.5, or from about 2.4 to about 5.0, or from about 2.4 to about 4.5, or from about 2.4 to about 4.0, or from about 2.4 to about 3.75, or from about 2.4 to about 3.5, or from about 2.5 to about 5.0, or from about 2.5 to about 4.5, or from about 2.5 to about 4.0, or from about 2.5 to about 3.75, or from about 2.5 to about 3.5.

In embodiments of the disclosure, the ethylene copolymer will have a Z average molecular weight distribution ($M_z/M_w$) as determined by gel permeation chromatography (GPC) of from about 1.6 to about 4.5, including narrower ranges within this range, such as for example, from about 1.8 to about 4.0, or from about 2.0 to about 4.0, or from about 1.8 to about 3.75, or from about 2.0 to about 3.75, or from about 1.8 to about 3.5, or from about 2.0 to about 3.5, or from about 1.8 to about 3.25, or from about 2.0 to about 3.25, or from about 1.8 to about 3.0, or from about 2.0 to about 3.0, or from about 1.8 to about 2.75, or from about 2.0 to about 2.75.

In an embodiment of the disclosure, the ethylene copolymer will have a so called "normal" (i.e. negative) comonomer distribution profile as measured using GPC-FTIR.

In the present disclosure, a "normal comonomer distribution" profile means that across the molecular weight range of the ethylene copolymer, comonomer contents for the various polymer fractions are not substantially uniform and that the comonomer incorporation decreases as molecular weight increases; if the comonomer incorporation is approximately constant with molecular weight, as measured using GPC-FTIR, the comonomer distribution is described as "flat" or "uniform" and the comonomer contents for the various polymer fractions is substantially uniform; the term "reverse comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse"); finally, where the comonomer incorporation rises with increasing molecular weight and then declines, the comonomer distribution is still considered "reverse", but may also be described as "partially reverse".

In an embodiment of the disclosure, the ethylene copolymer will have a comonomer distribution profile having a slope as determined by GPC-FTIR which is defined by: SCB/1000C at MW of 300,000–SCB/1000C at MW of 30,000 where "–" is a minus sign, SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the disclosure, the ethylene copolymer will have a commoner distribution profile having a slope, SCB/1000C at MW of 300,000–SCB/1000C at MW of 30,000, which satisfies the following:

$$-7.5 \leq (\text{SCB}/1000\text{C at MW of } 300,000 - \text{SCB}/1000\text{C at MW of } 30,000) \leq -3.5.$$

In an embodiment of the disclosure, the ethylene copolymer will have a commoner distribution profile having a slope, SCB/1000C at MW of 300,000–SCB/1000C at MW of 30,000, which satisfies the following:

$$-7.0 \leq (\text{SCB}/1000\text{C at MW of } 300,000 - \text{SCB}/1000\text{C at MW of } 30,000) \leq -3.5.$$

In an embodiment of the disclosure, the ethylene copolymer will have a commoner distribution profile having a slope, SCB/1000C at MW of 300,000–SCB/1000C at MW of 30,000, which satisfies the following:

$$-7.0 \leq (\text{SCB}/1000\text{C at MW of } 300,000 - \text{SCB}/1000\text{C at MW of } 30,000) \leq -4.5.$$

In an embodiment of the disclosure, the ethylene copolymer will have a commoner distribution profile having a slope, SCB/1000C at MW of 300,000–SCB/1000C at MW of 30,000, which satisfies the following:

$$-7.0 \leq (\text{SCB}/1000\text{C at MW of } 300,000 - \text{SCB}/1000\text{C at MW of } 30,000) \leq -4.0.$$

In an embodiment of the disclosure, the ethylene copolymer will have a commoner distribution profile having a slope, SCB/1000C at MW of 300,000–SCB/1000C at MW of 30,000, which satisfies the following:

$$-7.5 \leq (\text{SCB}/1000\text{C at MW of } 300,000 - \text{SCB}/1000\text{C at MW of } 30,000) \leq -4.5.$$

In an embodiment of the disclosure, the ethylene copolymer will have a commoner distribution profile having a slope, SCB/1000C at MW of 300,000–SCB/1000C at MW of 30,000, which satisfies the following:

$$-7.5 \leq (\text{SCB}/1000\text{C at MW of } 300,000 - \text{SCB}/1000\text{C at MW of } 30,000) \leq -4.0.$$

In an embodiment of the disclosure, the ethylene copolymer will have a commoner distribution profile having a slope, SCB/1000C at MW of 300,000–SCB/1000C at MW of 30,000, which satisfies the following:

$$-7.0 \leq (SCB/1000C \text{ at MW of } 300{,}000 - SCB/1000C \text{ at MW of } 30{,}000) \leq -5.0.$$

In an embodiment of the disclosure, the ethylene copolymer will have a commoner distribution profile having a slope, SCB/1000C at MW of 300,000–SCB/1000C at MW of 30,000, which satisfies the following:

$$-7.5 \leq (SCB/1000C \text{ at MW of } 300{,}000 - SCB/1000C \text{ at MW of } 30{,}000) \leq -5.0.$$

In an embodiment of the disclosure, the ethylene copolymer will have a commoner distribution profile having a slope, SCB/1000C at MW of 300,000–SCB/1000C at MW of 30,000, which satisfies the following:

$$-6.5 \leq (SCB/1000C \text{ at MW of } 300{,}000 - SCB/1000C \text{ at MW of } 30{,}000) \leq -5.0.$$

In an embodiment of the disclosure, the ethylene copolymer will have a commoner distribution profile having a slope, SCB/1000C at MW of 300,000–SCB/1000C at MW of 30,000, which satisfies the following:

$$-6.5 \leq (SCB/1000C \text{ at MW of } 300{,}000 - SCB/1000C \text{ at MW of } 30{,}000) \leq -4.5.$$

In an embodiment of the disclosure, the ethylene copolymer will have a commoner distribution profile having a slope, SCB/1000C at MW of 300,000–SCB/1000C at MW of 30,000, which satisfies the following:

$$-6.5 \leq (SCB/1000C \text{ at MW of } 300{,}000 - SCB/1000C \text{ at MW of } 30{,}000) \leq -4.0.$$

In an embodiment of the disclosure, the ethylene copolymer has a multimodal TREF profile comprising at least two elution intensity maxima (or peaks).

In an embodiment of the disclosure, the ethylene copolymer has a bimodal TREF profile comprising two elution intensity maxima (or peaks).

In an embodiment of the disclosure, the ethylene copolymer has a multimodal TREF profile defined by at least two intensity maxima (or peaks) occurring at elution temperatures Tp1, and Tp2, wherein Tp1 is between 80° C. to 90° C. and Tp2 is between 90° C. and 100° C.

In an embodiment of the disclosure, the ethylene copolymer has a multimodal TREF profile defined by at least two intensity maxima (or peaks) occurring at elution temperatures Tp1, and Tp2, wherein Tp1 is between 85° C. to 90° C. and Tp2 is between 90° C. and 100° C.

In an embodiment of the disclosure, the ethylene copolymer has a multimodal TREF profile defined by at least two intensity maxima (or peaks) occurring at elution temperatures Tp1, and Tp2, wherein Tp1 is between 85° C. to 95° C. and Tp2 is between 95° C. and 100° C.

In embodiments of the disclosure, less than 1 wt %, or less than 0.5 wt %, or less than 0.05 wt %, or 0 wt % of the ethylene copolymer will elute at a temperature of above 100° C. in a TREF analysis.

In an embodiment of the disclosure, the ethylene copolymer will have a composition distribution breadth index $CDBI_{50}$, as determined by temperature elution fractionation (TREF) of from about 15% to about 50% by weight, or from about 20% to about 45% by weight, or from about 20% to about 40% by weight, or from about 20% to about 35% by weight, or from about 22.5% to about 40% by weight, or from about 22.5% to about 37.5%, or from about 22.5 to about 35% by weight.

In an embodiment of the disclosure, the ethylene copolymer has a characteristic composition distribution parameter, $\beta_{T1}$ which satisfies the relationship: $\beta_{Tp1} \leq 22750 - 1400(SCB/1000C - 2.5 \times I_2)$, where $\beta_{Tp1} = (dMw_T/d_T)|_{T=Tp1}$ and SCB/1000C is the number short chain branches per 1000 carbons atoms. The $\beta_{Tp1}$ is determined from cross fractionation chromatography (CFC) using the method described in the Examples section.

In an embodiment of the disclosure, the ethylene copolymer has a characteristic composition transition parameter, $\phi_{Tp1 \to Tp2}$ which satisfies the relationship: $\phi_{Tp1 \to Tp2} \leq 4230 - 140[SCB/1000C + 0.5 \times (I_{21}/I_2) - 2 \times I_2]$, where $\phi_{Tp1 \to Tp2} = (\beta_{Tp2} - \beta_{Tp1})$ and SCB/1000C is the number short chain branches per 1000 carbons atoms. The $\phi_{Tp1 \to Tp2}$ is determined from cross fractionation chromatography (CFC) using the method described in the Examples section.

In an embodiment of the disclosure, the ethylene copolymer satisfies the following relationship: $0.8 \leq (Mw_{Tp1}/Mw) \leq 1.8$, where $Mw_{Tp1}$ = weight average molecular weight of ethylene copolymer material eluting at Tp1 and Mw is the weight average molecular weight of the entire ethylene copolymer. The $Mw_{Tp1}$ is determined from cross fractionation chromatography (CFC) using the method described in the Examples section.

In an embodiment of the disclosure, the ethylene copolymer satisfies the following relationship: $2.5 \leq [HD/(Tp2-Tp1)] \leq 5.5$, where HD is amount (in weight %) of "high density" ethylene copolymer, in weight percent, eluting at $\geq 94°$ C. in a TREF analysis, and where Tp1 and Tp2 correspond to the intensity maxima (or peaks) occurring at elution temperatures below 90° C. "Tp1", and above 90° C. "Tp2", respectively, in a TREF analysis.

In an embodiment of the disclosure, the ethylene copolymer has a hexanes extractables content of less than about 4.0 wt %, or less than about 3.5 wt %, or less than about 3.0 wt %, or less than about 2.5 wt %, or less than about 2.0 wt %, or less than about 1.75 wt %, or less than about 1.5 wt %, or less than about 1.0 wt %.

In embodiments of the disclosure, the ethylene copolymer will have a bulk density of at great than about 25 lbs/ft$^3$, or greater than about 26 lbs/ft$^3$, or greater than about 27 lbs/ft$^3$, or greater than about 28 lbs/ft$^3$.

Film Production

The extrusion-blown film process is a well-known process for the preparation of plastic film. The process employs an extruder which heats, melts and conveys the molten plastic and forces it through an annular die. Typical extrusion temperatures are from 330 to 500° F., especially 350 to 460° F.

In an extrusion-blown film process an ethylene copolymer film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation (in both the machine direction and the axial or cross direction).

A balance of "machine direction" ("MD") and "transverse direction" ("TD"-which is perpendicular to MD) molecular orientation is generally considered desirable for films (for example, Dart Impact strength, Machine Direction and Transverse Direction tear properties may be affected).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

In an embodiment of the disclosure, the films of this disclosure are prepared using the above described blown film process.

An alternative process is the so-called cast film process, wherein the ethylene copolymer is melted in an extruder, then forced through a linear slit die, thereby "casting" a thin flat film. The extrusion temperature for cast film is typically somewhat hotter than that used in the blown film process (with typically operating temperatures of from 450 to 550° F.). In general, cast film is cooled (quenched) more rapidly than blown film.

In an embodiment of the disclosure, the films of this disclosure are prepared using a cast film process.

Additives

The ethylene copolymer composition used in the current disclosure to make films, may also contain additives, such as for example, primary antioxidants (such as hindered phenols, including vitamin E); secondary antioxidants (especially phosphites and phosphonites); nucleating agents, plasticizers or polymer processing aids PPAs (e.g. fluoroelastomer and/or polyethylene glycol bound process aid), acid scavengers, stabilizers, anticorrosion agents, blowing agents, other ultraviolet light absorbers such as chain-breaking antioxidants, etc., quenchers, antistatic agents, slip agents, anti-blocking agent, pigments, dyes and fillers and cure agents such as peroxide.

These and other common additives in the polyolefin industry may be present in ethylene copolymer compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In an embodiment of the disclosure, antioxidants and stabilizers such as organic phosphites and phenolic antioxidants may be present in the ethylene copolymer compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris (nonyl phenyl) phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present in the ethylene copolymer composition from 0.1 to 50 wt % in one embodiment, and from 0.1 to 25 wt % of the composition in another embodiment, and from 0.2 to 10 wt % in yet another embodiment. Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may include any other fillers and porous fillers and supports which are known in the art.

Fatty acid salts may also be present in the ethylene copolymer compositions. Such salts may be present from 0.001 to 2 wt % of the ethylene copolymer composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of the ethylene copolymer and one or more additives, sufficient mixing should take place to assure that a uniform blend will be produced prior to conversion into a finished product. The ethylene copolymer can be in any physical form when used to blend with the one or more additives. In one embodiment, reactor granules, defined as the granules of polymer that are isolated from the polymerization reactor, are used to blend with the additives. The reactor granules have an average diameter of from 100 µm to 2 mm, and from 200 µm to 1.5 mm in another embodiment. Alternately, the ethylene copolymer is in the form of pellets, such as, for example, having an average diameter of from 1 mm to 6 mm that are formed from melt extrusion of the reactor granules.

One method of blending the additives with the ethylene copolymer is to contact the components in a tumbler or other physical blending means, the copolymer being in the form of reactor granules. This can then be followed, if desired, by melt blending in an extruder. Another method of blending the components is to melt blend the ethylene copolymer pellets with the additives directly in an extruder, or any other melt blending means.

Film Properties.

The film, or film layer of the present disclosure is made from the ethylene copolymers defined as above. Generally, an additive as described above is mixed with the ethylene copolymer prior to film production.

In an embodiment of the present disclosure, a 0.8 mil blown film will have a dart impact of ≥300 g/mil when the film is made at a blow up ratio (BUR) of 2:1 using an 85 mil die gap. In an embodiment of the present disclosure, a 0.8 mil blown film will have a dart impact of ≥325 g/mil when the film is made at a blow up ratio (BUR) of 2:1 using an 85 mil die gap. In an embodiment of the present disclosure, a 0.8 mil blown film will have a dart impact of ≥350 g/mil when the film is made at a blow up ratio (BUR) of 2:1 using an 85 mil die gap. In an embodiment of the present disclosure, a 0.8 mil blown film will have a dart impact of ≥375 g/mil when the film is made at a blow up ratio (BUR) of 2:1 using an 85 mil die gap.

In an embodiment of the present disclosure, a 0.8 mil blown film will have a machine direction (MD) tear of ≥375 g/mil when the film is made at a blow up ratio (BUR) of 2:1 using an 85 mil die gap. In an embodiment of the present disclosure, a 0.8 mil blown film will have a machine direction (MD) tear of ≥400 g/mil when the film is made at a blow up ratio (BUR) of 2:1 using an 85 mil die gap. In an embodiment of the present disclosure, a 0.8 mil blown film will have a machine direction (MD) tear of ≥425 g/mil when the film is made at a blow up ratio (BUR) of 2:1 using an 85 mil die gap.

In an embodiment of the present disclosure, a 0.8 mil blown film will have a transverse direction (TD) tear of ≥700 g/mil when the film is made at a blow up ratio (BUR) of 2:1 using an 85 mil die gap. In an embodiment of the present disclosure, a 0.8 mil blown film will have a transverse direction (TD) tear of ≥725 g/mil when the film is made at a blow up ratio (BUR) of 2:1 using an 85 mil die gap. In an embodiment of the present disclosure, a 0.8 mil blown film will have a transverse direction (TD) tear of ≥750 g/mil when the film is made at a blow up ratio (BUR) of 2:1 using an 85 mm die gap. In an embodiment of the present disclosure, a 0.8 mil blown film will have a transverse direction (TD) tear of ≥775 g/mil when the film is made at a blow up ratio (BUR) of 2:1 using an 85 mil die gap. In an embodiment of the present disclosure, a 0.8 mil blown film will have a transverse direction (TD) tear of ≥800 g/mil when the film is made at a blow up ratio (BUR) of 2:1 using an 85 mil die gap. In an embodiment of the present disclosure, a 0.8 mil blown film will have a transverse direction (TD) tear of ≥825 g/mil when the film is made at a blow up ratio (BUR) of 2:1 using an 85 mil die gap. In an embodiment of the present disclosure, a 0.8 mil blown film will have a transverse direction (TD) tear of ≥850 g/mil when the film is made at a blow up ratio (BUR) of 2:1 using an 85 mil die gap. In an embodiment of the present disclosure, a 0.8 mil blown film will have a transverse direction (TD) tear of ≥875 g/mil when the film is made at a blow up ratio (BUR) of 2:1 using an 85 mil die gap.

In an embodiment of the present disclosure, a 0.8 mil blown film will have a machine direction (MD) secant modulus at 1% strain of ≥160 MPa when the film is made at a blow up ratio (BUR) of 2:1 using an 85 mil die gap. In an embodiment of the present disclosure, a 0.8 mil blown film will have a machine direction (MD) secant modulus at 1% strain of ≥170 MPa when the film is made at a blow up ratio (BUR) of 2:1 using an 85 mil die gap. In an embodiment of the present disclosure, a 0.8 mil blown film will have a machine direction (MD) secant modulus at 1% strain of ≥180 MPa when the film is made at a blow up ratio (BUR) of 2:1 using an 85 mil die gap. In an embodiment of the present disclosure, a 0.8 mil blown film will have a machine direction (MD) secant modulus at 1% strain of ≥190 MPa when the film is made at a blow up ratio (BUR) of 2:1 using an 85 mil die gap.

In an embodiment of the present disclosure, a 0.8 mil blown film will have a transverse direction (TD) secant modulus at 1% strain of ≥160 MPa when the film is made at a blow up ratio (BUR) of 2:1 using an 85 mil die gap. In an embodiment of the present disclosure, a 0.8 mil blown film will have a transverse direction (TD) secant modulus at 1% strain of ≥170 MPa when the film is made at a blow up ratio (BUR) of 2:1 using an 85 mil die gap. In an embodiment of the present disclosure, a 0.8 mil blown film will have a transverse direction (TD) secant modulus at 1% strain of ≥180 MPa when the film is made at a blow up ratio (BUR) of 2:1 using an 85 mil die gap. In an embodiment of the present disclosure, a 0.8 mil blown film will have a transverse direction (TD) secant modulus at 1% strain of ≥190 MPa when the film is made at a blow up ratio (BUR) of 2:1 using an 85 mil die gap.

In an embodiment of the disclosure, a 0.8 mil blown film made at a blow up ratio (BUR) of 2:1 using an 85 mil die gap will have a haze of less than about 30%, or less than about 28%, or less than about 26%, or less than about 24%, or less than about 22%, or less than about 20%, or less than about 18%.

In an embodiment of the disclosure, a 0.8 mil blown film made at a blow up ratio (BUR) of 2:1 using an 85 mil die gap film will have a gloss at 450 of at least about 30, or at least about 32, or at least about 34, or at least about 36, or at least about 38, or at least about 40.

The film or film layer may, by way of non-limiting example only, have a total thickness ranging from 0.5 mils to 4 mils (note: 1 mil=0.0254 mm), which will depend on for example the die gap employed during film casting or film blowing.

The above description applies to monolayer films. However, the film of the current disclosure may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film of the current disclosure may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is involved in the sealing of the film to itself or to another layer in a multilayer film. A "tie layer" refers to any internal layer that adheres two layers to one another.

By way of example only, the thickness of the multilayer films can be from about 0.5 mil to about 10 mil total thickness.

The films can be used for bags, liner, wrap, shrink film, agricultural film, garbage bags and shopping bags. The films can be produced by blow extrusion, cast extrusion, co-extrusion and be incorporated also in laminated structures.

EXAMPLES

General

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v15, p. 1518 or used directly after being stored over activated 4 Å molecular sieves.

Melt index, $I_2$, in g/10 min was determined on a Tinius Olsen Plastomer (Model MP993) in accordance with ASTM D1238 Procedure A (Manual Operation) at 190° C. with a 2.16 kilogram weight. High load melt index, $I_{21}$, in g/10 min was determined in accordance with ASTM D1238 Procedure A at 190° C. with a 21.6 kilogram weight. Melt flow ratio (also sometimes called melt index ratio) is $I_{21}/I_2$.

Polymer density was determined in grams per cubic centimeter (g/cm³) according to ASTM D792.

Molecular weight information ($M_w$, $M_n$ and $M_z$ in g/mol) and molecular weight distribution ($M_w/M_n$), and z-average molecular weight distribution ($M_z/M_W$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables using compression molded plaques were determined according to ASTM D5227.

Polymer bulk density (reported as lb/ft³) was measured in general accordance with ASTM D1895-96 (2003).

To determine the composition distribution breadth index $CDBI_{50}$ (which is also designated CDBI(50) in the present disclosure so that $CDBI_{50}$ and CDBI(50) are used interchangeably), a solubility distribution curve is first generated for the copolymer. This is accomplished using data acquired from the TREF technique (see below). This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median (see WO 93/03093 for the definition of $CDBI_{50}$). The weight percentage of copolymer eluting at ≥94° C., is determined by calculating the area under the TREF curve at an elution temperature of ≥94° C. The weight percent of copolymer eluting below at above 100° C. was determined similarly.

For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the $CDBI_{50}$ measurement.

The specific temperature rising elution fractionation (TREF) method used herein was as follows. Homogeneous polymer samples (pelletized, 50 to 150 mg) were introduced into the reactor vessel of a crystallization—TREF unit (Polymer Char™). The reactor vessel was filled with 20 to 40 mL 1,2,4-trichlorobenzene (TCB), and heated to the desired dissolution temperature (e.g. 150° C.) for 1 to 3 hours. The solution (0.5 to 1.5 mL) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer Char software, Excel spreadsheet and TREF software developed in-house.

The TREF procedures described above are well known to persons skilled in the art and can be used to determine the temperatures or temperature ranges where elution intensity maxima (elution peaks) occur.

For cross fractionation chromatography (CFC), a polymer sample (100 to 200 mg) was introduced into a sample dissolution vessel in the Polymer Char crystal-TREF unit. The sample dissolution vessel was filled with 25 to 35 ml 1,2,4-trichlorobenzene (TCB) containing 250 ppm antioxidant 2,6-di-tert-butyl-4-methylphenol (BHT) and heated to the desired dissolution temperature (e.g. 140° C.) for 2 to 3 hours. The polymer solution (1.0 ml) was then loaded into the TREF column filled with stainless steel beads and equilibrated at a given stabilization temperature (e.g. 110° C.) for 20 to 45 minutes. The polymer solution was allowed to crystallize by dropping from the stabilization temperature to 30° C. at 0.2° C./minute. After equilibrating at 30° C. for 90 minutes, the crystallized sample was eluted with TCB from 30 to 110° C., where 5 to 20 fractions were collected for the polymer characterization. Each eluted fraction was heated to a specific dissolution temperature, equilibrated for at least 50 minutes and subsequently introduced directly to a GPC system through a heated transfer line for testing. All above steps, including the sample dissolution, sample solution loading into TREF column, crystallization and elution, were programmed and controlled using the Polymer Char TREF software with the step-elution capability.

The polymer fractions were chromatographed at 140° C. on a PL 220 high-temperature chromatography unit equipped with either four SHODEX columns (HT803, HT804, HT805 and HT806), or four PL Mixed ALS or BLS columns, and with a differential refractive index (DRI) as the concentration detector. TCB was the mobile phase with a flow rate of 1.0 mL/minute, BHT was added to the mobile phase at a concentration of 250 ppm to protect SEC columns and polymer from oxidative degradation. The SEC columns were calibrated with narrow distribution polystyrene standards. The polystyrene molecular weights were converted to polyethylene molecular weights using the Mark-Houwink equation, as described in the ASTM D6474. The data were acquired and processed with CIRRUS GPC software and EXCEL spreadsheet.

The melting points including a peak melting point ($T_m$) and the percent crystallinity of the copolymers are determined by using a TA Instrument DSC Q1000 Thermal Analyzer at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

Dynamic Mechanical Analysis (DMA). Rheological measurements (e.g. small-strain (10%) oscillatory shear measurements) were carried out on a Discovery Hybrid Rheometer DHR-3 rotational rheometer with 25 mm diameter cone and plate in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.02 to 126 rad/s and 190° C. TRIOS and Orchestrator Software are used to determine the viscoelastic parameters including the storage modulus (G'), loss modulus (G"), phase angle (δ), complex modulus (G*) and complex viscosity (η*).

The Shear Thinning Index (SHI) was determined according to the method provided in U.S. Pat. Appl. No. 2011/0212315: the SHI is defined as $SHI(\omega)=\eta^*(\omega)/\eta 0$ for any given frequency (ω) for dynamic viscosity measurement, wherein η0 is zero shear viscosity @190° C. determined via the empiric Cox-Merz-rule. η* is the complex viscosity @190° C. determinable upon dynamic (sinusoidal) shearing or deformation of a copolymer as determined on a Discovery Hybrid Rheometer DHR-3 rotational rheometer using cone and plate geometry. According to the Cox-Merz-Rule, when the frequency (w) is expressed in Radiant units, at low shear rates, the numerical value of η* is equal to that of conventional, intrinsic viscosity based on low shear capillary measurements. The skilled person in the field of rheology is well versed with determining η0 in this way.

The films of the current examples were made on a blown film line manufactured by Battenfeld Gloucester Engineering Company of Gloucester, Mass. using a die diameter of 4 inches, and a die gap of 85 mil. This blown film line has a standard output of more than 100 pounds per hour and is equipped with a 50 horsepower motor. Screw speed was 25 to 50 RPM. The extruder screw has a 2.5 mil diameter and a length/diameter (L/D) ratio of 24/1. Melt Temperature and Frost Line Height (FLH) are 420 to 430° F. and 14 inches respectively. 1000 ppm of calcium strearate masterbatch was added to the resins to improve the film appearance while the films were made. The blown film bubble is air cooled. Typical blow up ratio (BUR) for blown films prepared on this line are from 1.5/1 to 4/1. An annular die having a gap of 85 mil was used for these experiments.

The haze (%) was measured in accordance with the procedures specified in ASTM D 1003-07, using a BYK-Gardner Haze Meter (Model Haze-gard plus).

Dart impact strength was measured on a dart impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT(HIGH)-500N-192) in accordance with ASTM D-5748

TEF & Lube puncture resistance was measured on a MTS Systems Universal Tester (Model SMT(HIGH)-500N-192) using a ¾" diameter Teflon-coated round probe at a crosshead speed of 20 in/min. This test measures the energy required to puncture polyethylene films. A specimen of 4¼ wide and lay flat length was cut from a blown film sample in the transverse direction and then clamped on the tester. About 1 cm³ of lube was applied to the centre of the film and the TEFLON-coated probe was set at 0.25 inch above the specimen for the testing. MTS Testworks software was used for the operation of the tester and the data acquisition and processing.

Secant modulus and tensile properties were measured on the Type IV tensile specimens using an Instron Robotic Universal Tester with a grip separation of 2.0 inches in a single test. Testmaster2™ and Bluehill™ software were used for the operation of the robotic system and test frame respectively for the testing. The secant modulus was first tested at a crosshead speed of 1.0 in/min up to 5.0% strain and then followed by a tensile test at 20 in/min until the specimen breaks in compliant with ASTM D638. The MD or TD secant modulus was determined from an initial slope of the stress-strain curve from an origin to 1% strain.

Re-block test of film was carried out at 60° C. on a Kayeness Blocking Tester (Model D-9046). A specimen was cut from a film sample across the lay flat or in the transverse direction and placed under the 5"×8" plates with the weight equivalent to 1 psi in an oven at 60° C. for 24 hours. Then the film sample was conditioned at 23° C. under the weighted plates for at least 16 hours prior to testing. The film sample was clamped to the platens of the tester and tested at a loading rate of 90 g/min until the separation of the two film layers reached inch.

The re-block data is reported as the blocking load at a desired film separation and temperature.

Gloss was measured on a BYK-Gardner 45° Micro-Gloss unit in accordance with ASTM D2457-03.

Ziegler-Natta Catalyst Synthesis

Silica (Sylopol 2408™ which is commercially available from Grace Davison) was dried at 150° C. for a day in an oven and then transferred into a cylindrical tube. The tube was heated to 200° C. under a flow of air for a further 2 hours. After this time, the air was turned off, nitrogen was slowly passed over the silica and the temperature was increased to 600° C. for 6 hours. The oven was then turned off and the silica was allowed to cool to room temperature. The silica was then transferred into a glovebox for storage. In a glovebox, 50 g of silica was added to a 1 L three neck flask and brought into the fume hood. To the flask was added pentane (120 g). An overhead stirrer was used to provide stirring. With stirring, triethylaluminum (TEAL) in n-hexane (12.6 g of 24.2 wt. %) was added to the silica over approximately 5 minutes at room temperature. The amount of TEAL was adjusted such that the total amount of TEAL (including the TEAL present as a viscosity modifier in the BEM added in the next step) was 0.555 mmol of Al per g of silica. The slurry was stirred for 1 hour at room temperature. Next, at room temperature, 32.5 g of a 20.4 wt. % solution of Butyl Ethyl Magnesium (BEM) in heptane from Akzo (which contains ~1.4% by weight of TEAL) was added over about 10 minutes to give 1.2 mmol of BEM per gram of silica. A small exotherm was observed at this stage. The mixture was stirred for 2 hours after the addition of the magnesium compound was complete. Next, the reaction mixture was cooled it an ice bath and 11.4 g of dried tert-butyl chloride (t-BuCl) along with pentane (in a ~2:1 weight ratio of pentane to t-BuCl was used) was added to the mixture over approximately 20 minutes. This caused the mixture of slurried materials to thicken somewhat. After addition, the slurried materials were stirred for a further 2 hours (Cl:Mg molar ratio=2.05). To the slurry was then added, at room temperature, 1.14 g of $TiCl_4$ along with isopentane (a 10:1 weight ratio of pentane to $TiCl_4$ was used) over approximately 5 minutes. The mixture was then stirred for 2 hours and then allowed to sit overnight. In the next step, 3.04 g of triethylamine (which has been previously dried over molecular sieves) was added to the mixture at room temperature over about five minutes, followed by stirring for an additional 1 hour. Finally, to the slurry mixture was added, 20.0 g of a 25.5% by weight solution of tri-n-hexylaluminum in hexane over about 10 minutes. The mixture was then stirred for 45 minutes. After this, the slurry was dried in vacuo until most of the solvent was removed at which time the temperature was increased to 50° C. until the catalyst was fully dried. (Total Al:Ti=7.6:1; Mg:Ti=10; Cl:Mg=2.05; triethylamine:Ti=5; Ti loading=0.39 weight % based on the weight of the final catalyst).

Polymerization

Continuous ethylene/1-hexene gas phase copolymerization experiments were conducted in a 56.4 L Technical Scale Reactor (TSR) in continuous gas phase operation in the presence of hydrogen, nitrogen, the Ziegler-Natta catalyst and triethylaluminum (TEAL) as a cocatalyst. Ethylene polymerizations were run at 88° C. with a total operating pressure of 300 pounds per square inch gauge (psig). Gas phase compositions for ethylene was controlled via closed-loop process control to values of 38.7. 1-Hexene was metered into the reactor in a molar flow ratio of 0.070 or 0.071 relative to ethylene feed while hydrogen was metered into the reactor in a molar feed ratio of 0.030 or 0.036 relative to ethylene feed during polymerization. Nitrogen constituted the remainder of the gas phase mixture (approximately 48-50 mole %). A typical production rate for these conditions is 2.0 to 3.0 kg of polyethylene per hour. Steady state polymerization conditions are provided in Table 1 (C2=ethylene; C6=1-hexene; C6/C2 is the molar feed ratio of each component to the reactor; H2/C2 is the molar feed ratio of each component to the reactor).

TABLE 1

| Polymerization Conditions | | |
|---|---|---|
| Ethylene Copolymer No. | Inv. 1 | Inv. 2 |
| Productivity (g PE/g Cat) | 2200 | 2000 |
| Hydrogen (mol %) | 8.3 | 6.3 |
| Ethylene (mol %) | 38.7 | 38.7 |
| C6/C2 (mol/mol feed) | 0.071 | 0.070 |
| H2/C2 (mol/mol feed) | 0.036 | 0.030 |
| Temp (° C.) | 88 | 88 |
| Production rate (kg/hr) | 2.5 | 2.5 |
| Residence Time (hrs) | 2 | 2 |
| Bulk Density (lb per cubic foot) | 28.5 | 28.7 |
| Isopentane (weight %) | 0 | 0 |

Pelletization of Granular Resins.

The granular resins obtained from the above polymerization process were pelletized. IRGANOX 1076 (ca. 300 ppm), Irganox 1010 (ca. 200 ppm) and TNPP (ca. 1500 ppm), an antiblocking compound (ca. 5000-6700 ppm), and a slip agent (ca. 1500 ppm) were dry blended with granular resin prior to pelletization. The resulting powder blend was extruded on Coperion ZSK26 twin-screw extruder with a screw diameter of 25.5 mm and L/D ratio of 30/1 under nitrogen atmosphere to minimize polymer degradation. The pelletization conditions of the extruder were set at a melt temperature of 235° C. an output rate of 30 to 40 lb/hr, a screw speed of 200 rpm and a pelletizer speed of 950 rpm. The pelleted resin was cooled and then collected for the resin characterization and film evaluation.

Polymer data for the resulting inventive ethylene copolymers 1 and 2 are provided in Table 2, along with data for a number of commercially available ethylene/1-hexene copolymers having similar densities and melt indices ($I_2$). Comparative resin A is an ethylene/1-hexene copolymer having a density of 0.919 g/cm³, a melt index ($I_2$) of 0.85 g/10 min, and is commercially available from NOVA Chemicals under the name TD-9022-D™. Comparative B is an ethylene/1-hexene copolymer having a density of 0.922 g/cm³, a melt index ($I_2$) of 0.80 g/10 min, and is commercially available from Formosa Plastics Corporation. Comparative C is an ethylene/1-hexene copolymer having a density of 0.920 g/cm³, a melt index ($I_2$) of 0.91 g/10 min, and is commercially available from ExxonMobil. Comparative D is an ethylene/1-hexene copolymer having a density of 0.919 g/cm³, a melt index ($I_2$) of 0.53 g/10 min, and is commercially available LyondellBasell Industries. Comparative E is an ethylene/1-hexene copolymer having a density of 0.916 g/cm³, a melt index ($I_2$) of 1.04 g/10 min, and is commercially available from Westlake Industries.

TABLE 2

| Example No. | Inv. 1 | Inv. 2 | Comp. A | Comp. B | Comp. C | Comp. D | Comp. E |
|---|---|---|---|---|---|---|---|
| Density, g/cm³ | 0.920 | 0.921 | 0.9119 | 0.9122 | 0.920 | 0.919 | 0.916 |
| Melt index, $I_2$ (dg/min) | 0.98 | 0.64 | 0.85 | 0.80 | 0.91 | 0.53 | 1.04 |
| Melt flow ratio, $I_{21}/I_2$ | 25.7 | 25.4 | 28.4 | 25.6 | 24.8 | 28.1 | 28.0 |

TABLE 2-continued

| Example No. | Inv. 1 | Inv. 2 | Comp. A | Comp. B | Comp. C | Comp. D | Comp. E |
|---|---|---|---|---|---|---|---|
| $M_n$ | 33461 | 44529 | 36566 | 38470 | 38067 | 37680 | 40596 |
| $M_w$ | 113577 | 121458 | 123466 | 118128 | 109873 | 138790 | 112062 |
| $M_z$ | 285489 | 266238 | 370770 | 276881 | 247973 | 405167 | 291670 |
| $M_w/M_n$ | 3.39 | 2.73 | 3.38 | 3.07 | 2.89 | 3.68 | 2.76 |
| $M_z/M_w$ | 2.51 | 2.19 | 3.00 | 2.34 | | | |
| No. of short chain branches per 1000 carbons | 17.3 | 16.5 | 17.8 | 17.5 | 16.6 | 16.8 | 16.6 |
| Weight % 1-hexene | 9.7 | 9.3 | 10.0 | 9.8 | 9.4 | 9.4 | 9.3 |
| GPC-FTIR Slope | −5.79 | −5.74 | −7.94 | −3.10 | −8.9 | −10.8 | −8.18 |
| DSC Melt Temp (° C.) | 124.8 | 124.7 | 124.2 | 125.8 | 124.3 | 123.9 | 122.1 |
| Polymer Crystallinity, wt % | 43.0 | 45.3 | 42.1 | 46.5 | 42.5 | 44.1 | 43.0 |
| SHI (ω = 5) | 0.54 | 0.47 | 0.56 | 0.53 | 0.56 | 0.39 | 0.56 |
| Bulk density, lbs/ft³ | 28.5 | 28.7 | 23.2 | — | — | — | — |

Figure 1B:
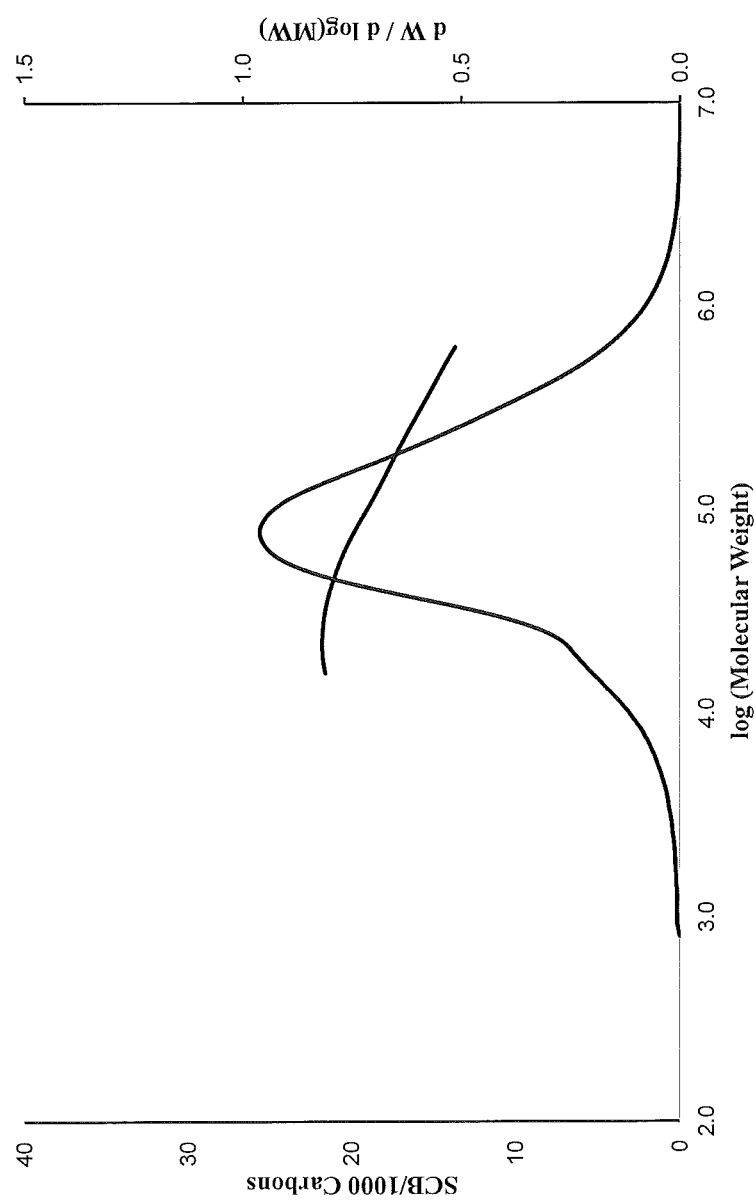
FIG. 1B shows a gel permeation chromatograph with Fourier transform infra-red (GPC-FTIR) detection obtained for an ethylene copolymer made according to the present disclosure. The comonomer content, shown as the number of short chain branches per 1000 carbons (y-axis), is given relative to the copolymer molecular weight (x-axis). The downwardly sloping line (from left to right) is the short chain branching (in short chain branches per 1000 carbons atoms) determined by FTIR. As can be seen in FIG. 1B, the number of short chain branches decreases at higher molecular weights, and hence the comonomer incorporation is said to be "normal".
Figure 1C:
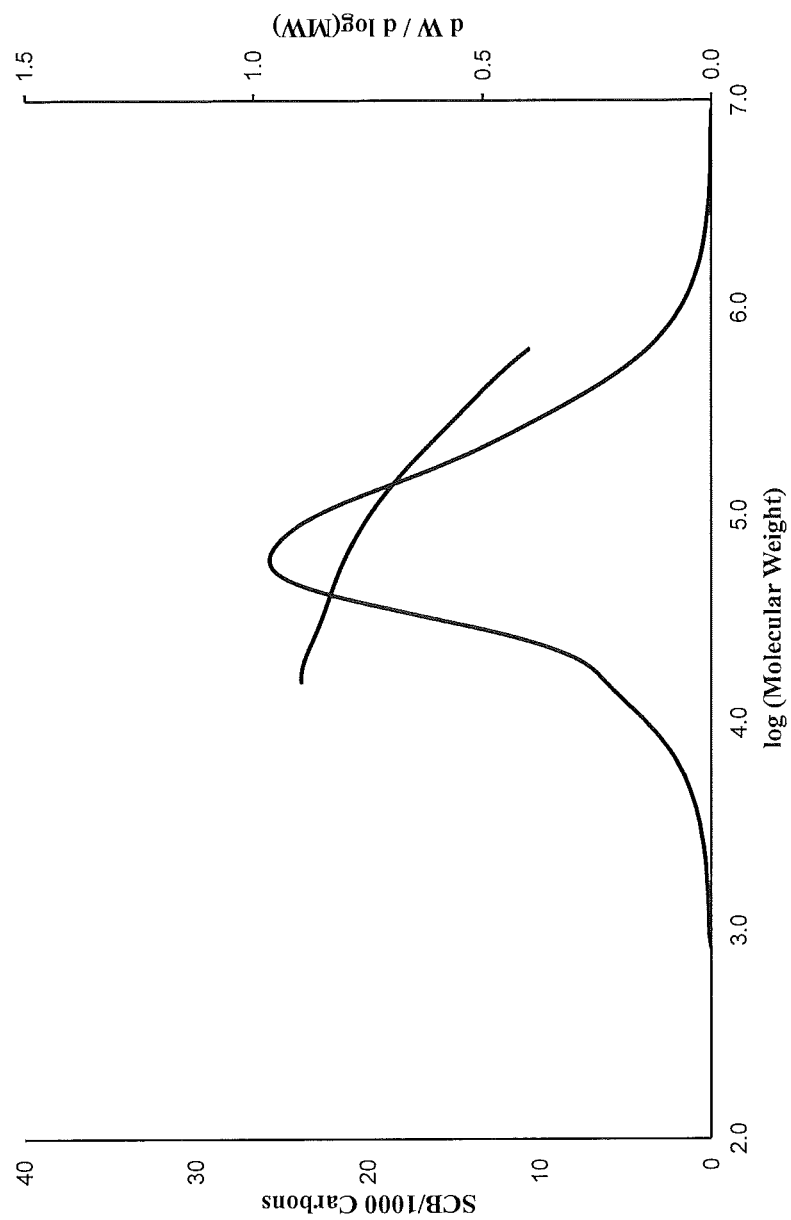
FIG. 1C shows a gel permeation chromatograph with Fourier transform infra-red (GPC-FTIR) detection obtained for a comparative ethylene copolymer. The comonomer content, shown as the number of short chain branches per 1000 carbons (y-axis), is given relative to the copolymer molecular weight (x-axis). The downwardly sloping line (from left to right) is the short chain branching (in short chain branches per 1000 carbons atoms) determined by FTIR. As can be seen in the Figure, the number of short chain branches decreases at higher molecular weights, and hence the comonomer incorporation is said to be "normal".

The data in Table 2 shows that the inventive copolymers 1 and 2 have reduced melt flow ratios relative to Comparative copolymers A, D and E. The data also shows that the inventive resins have a normal comonomer distribution having a slope that is significantly lower than that observed for comparative copolymers A, C, D and E, but which is significantly higher than that observed for comparative copolymer B. Indeed, the inventive ethylene copolymers 1 and 2 have a normal conomonmer distribution, but the slope of the distribution lies somewhere between that expected for a Ziegler-Natta catalyst and that expected for a single site catalyst. The slope of the comonomer distribution is determined by GPC-FTIR and is defined by: SCB/1000C at MW of 300,000−SCB/1000C at MW of 30,000 where "−" is a minus sign, SCB/1000C is the comonomer content determined as the number of short chain branches per thousand carbons and MW is the corresponding molecular weight (i.e. the absolute molecular weight) on a GPC or GPC-FTIR chromatograph. As shown in FIGS. 1 and 2 and by the data in Table 1, the slope of the comonomer distribution for inventive copolymers 1 and 2 is less than about −3.5, but greater than about −7.5.

Further, as can be seen from the data in Table 2, inventive copolymers 1 and 2 each have a bulk density of more than 28 lbs/ft³, while the comparative copolymer A has an average bulk density of about 23 lbs/ft³.

The inventive ethylene copolymers 1 and 2 can be distinguished from a number of commercially available ethylene/1-hexene resins using cross fractionation chromatography (CFC). In cross fractionation chromatography, the ethylene copolymer is first fractionated using a temperature rising elution fractionation (TREF) method, followed by the analysis of each of the eluted fractions with gel permeation chromatography (GPC) and refractive index (RI) detection. Hence, the weight average molecular weight, $M_w$ of a polymer fraction eluting at a specific TREF temperature, T, can be determined as $M_{wT}$. The cross-fractionation elution analysis for inventive ethylene copolymer 1 is shown in FIG. 2A.

It is apparent, from the data provided in FIG. 2A, that the ethylene copolymer has a bimodal TREF elution profile. The bimodality is defined by two distinct peaks or maximums present in the TREF elution curve: the first peak or maximum of intensity occurs at a TREF elution temperature of Tp1; the second peak or maximum of intensity occurs at a TREF elution temperature of Tp2. The CFC data for inventive ethylene copolymer 1 also shows that the GPC determined $M_{wT}$ values (filled circles) gradually increased with an increase in the TREF fraction elution temperatures. Hence, a quadratic equation was chosen to model the relationship between the weight average molecular weight and elution temperature shown in FIG. 2A, $$M_{wT} = a \times T^2 + b \times T + c. \qquad (1)$$

Simple curve fitting (see the dashed line in FIG. 2A) of the CFC data then provided the values for the constants a, b and c.

Using this model, we were able to define a so called "characteristic composition distribution parameter" $\beta_{Tp1}$ which could differentiate between different ethylene copolymer compositions (see below).

The "characteristic composition distribution parameter", $\beta_{Tp1}$ is defined as the first derivative (or gradient) of Equation 1 at a temperature equal to the temperature at which the first of two elution peaks or maxima occurs in the cross fractionation data, Tp1. Hence, $$\beta_{Tp1} = (dM_{wT}/dT)|_{T=Tp1} = 2a \times Tp1 + b. \qquad (2)$$

A similar "characteristic composition distribution parameter", $\beta_{Tp2}$ can be defined as the first derivative (or gradient) of Equation 1, taken at a temperature Tp2, which corresponds to the location of the peak elution temperature of the higher of two elution peaks observed in the cross fractionation chromatograph. Hence, $$\beta_{Tp2} = (dM_{wT}/dT)|_{T=Tp2} = 2a \times Tp2 + b. \qquad (3)$$

Finally, as the CFC data collected for a series of ethylene copolymers showed that there was a significant difference in the ethylene copolymer fractions eluting at the temperatures Tp1 and Tp2, another parameter was defined to capture the relative difference between these two fractions for each of the ethylene copolymers, the so called "characteristic composition transition parameter", $\phi_{Tp1 \to Tp2}$. The $\phi_{Tp1 \to Tp2}$ is defined as the first derivative (or gradient) of Equation 1 between the two elution intensity peak temperatures, Tp2 and Tp1. Hence, $$\phi_{Tp1 \to Tp2} = \beta_{Tp2} - \beta_{Tp1} = 2a \times (Tp2 - Tp1) \qquad (4)$$

Without wishing to be bound by theory, the smaller the $\phi_{Tp1 \to Tp2}$ value, the more uniform the ethylene copolymer comonomer incorporation is with respect to the molecular weight of the ethylene copolymer.

Figure 2B:
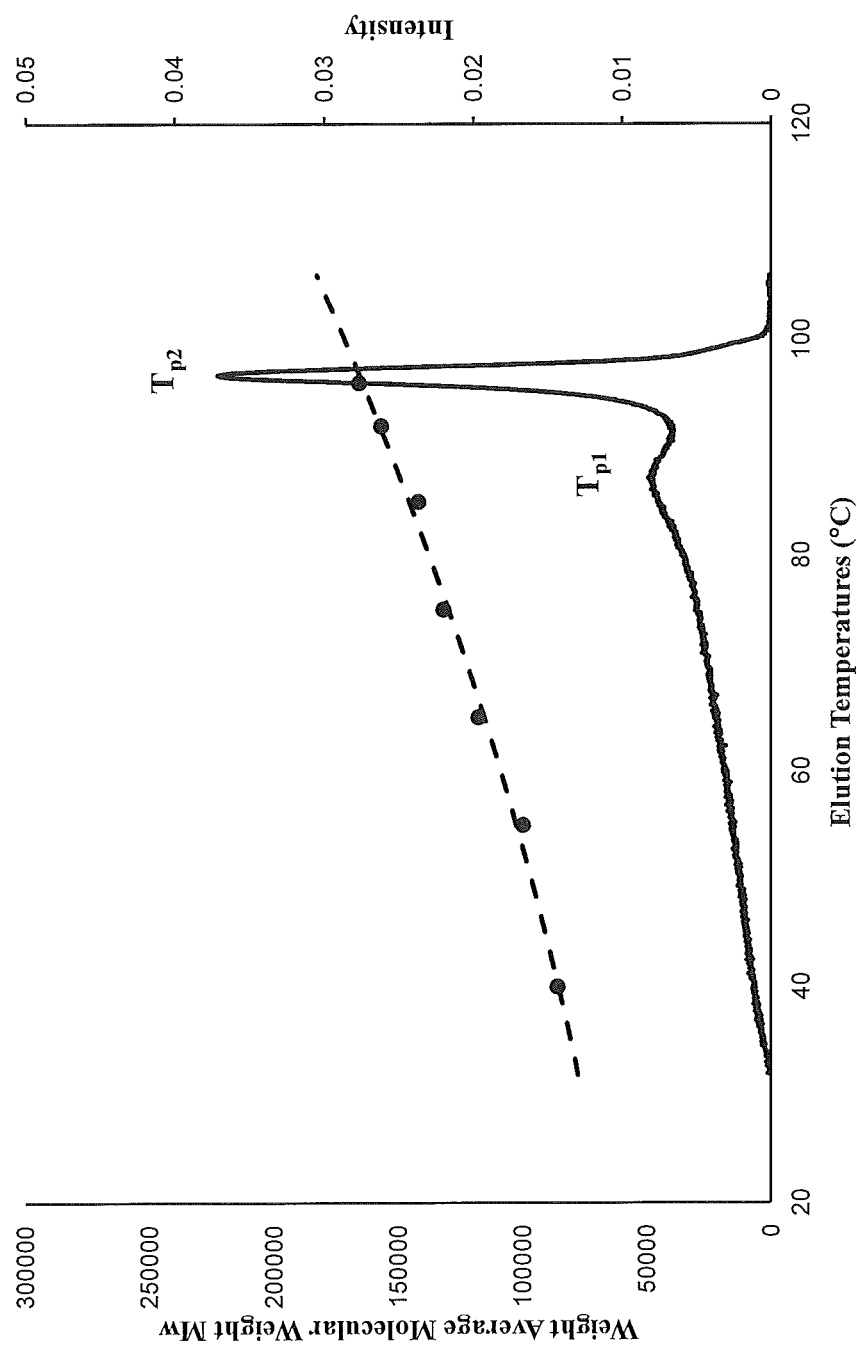
Figure 2C:
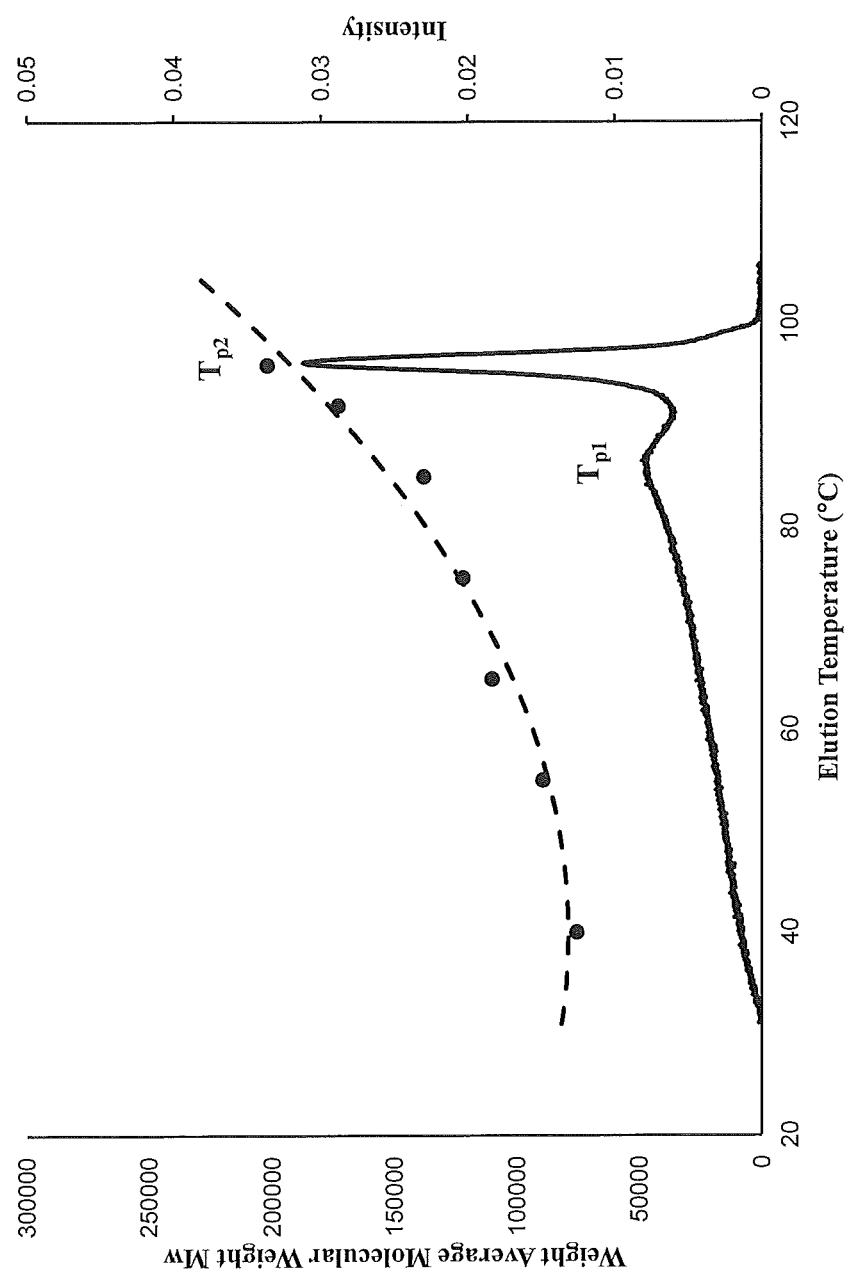

FIGS. 2A, 2B and 2C show the CFC analysis (and the quadratic equation model curve fitting as the dashed line) of inventive ethylene copolymer 1, inventive ethylene copolymer 2 and comparative ethylene copolymer A respectively. Relevant CFC data together with the corresponding quadratic equation model curve fitting values (i.e. $M_{wT} = a \times T^2 + b \times T + c$) are provided for these resins in Table 3.

TABLE 3

CFG Modelling Data

| Example No. | Inv. 1 | Inv. 2 | Comp. A |
|---|---|---|---|
| Mw at 40° C. | 90600 | 86100 | 75500 |
| Mw at 55° C. | 111000 | 100000 | 89500 |
| Mw at 65° C. | 126000 | 118000 | 110000 |
| Mw at 75° C. | 131000 | 132000 | 122000 |
| Mw at 85° C. | 136000 | 142000 | 138000 |
| Mw at 92° C. | 159000 | 157000 | 173000 |
| Mw at 96° C. | 177000 | 166000 | 202000 |
| a | 10.7 | 6.8 | 36.0 |
| b | −131 | 483 | −2873 |
| c | 82090 | 55433 | 136201 |

Similar CFC data was obtained and modelled in an analogous way for comparative resins B, C, D and E. The values for Tp1, Tp2, the value for the characteristic composition distribution parameter, $\beta_{Tp1}$ as well as the characteristic composition transition parameter, $\phi_{Tp1 \rightarrow Tp2}$, the weight average molecular weight at Tp1, the amount of the fraction eluting at ≥94° C., and the composition distribution breadth index (CDBI$_{50}$) for the inventive and comparative ethylene copolymers are summarized in Table 4.

TABLE 4

CFC and TREF Data and Parameters

| Example No. | Tp1 (° C.) | Tp2 (° C.) | $\beta_{Tp1}$ (Daltons/° C.) | MW$_{Tp1}$ | $\phi_{Tp1 \rightarrow Tp2}$ (Daltons/° C.) | HD @ T ≥ 94° C. (wt %) | CDBI$_{50}$ (%) |
|---|---|---|---|---|---|---|---|
| Inv. 1 | 86.9 | 96.8 | 1729 | 151508 | 212 | 38.2 | 29.7 |
| Inv. 2 | 86.5 | 96.7 | 1660 | 148100 | 139 | 38.1 | 29.4 |
| Comp. A | 86.0 | 96.1 | 3312 | 155066 | 726 | 32.6 | 31.9 |
| Comp. B | 86.6 | 96.9 | 1306 | 116666 | 270 | 46.4 | 25.0 |
| Comp. C | 86.9 | 96.3 | 2921 | 150275 | 508 | 35.3 | 30.8 |
| Comp. D | 86.2 | 96.4 | 3018 | 143821 | 543 | 37.3 | 29.7 |
| Comp. E | 86.0 | 96.1 | 3537 | 151404 | 772 | 28.7 | 34.8 |

Figure 3:
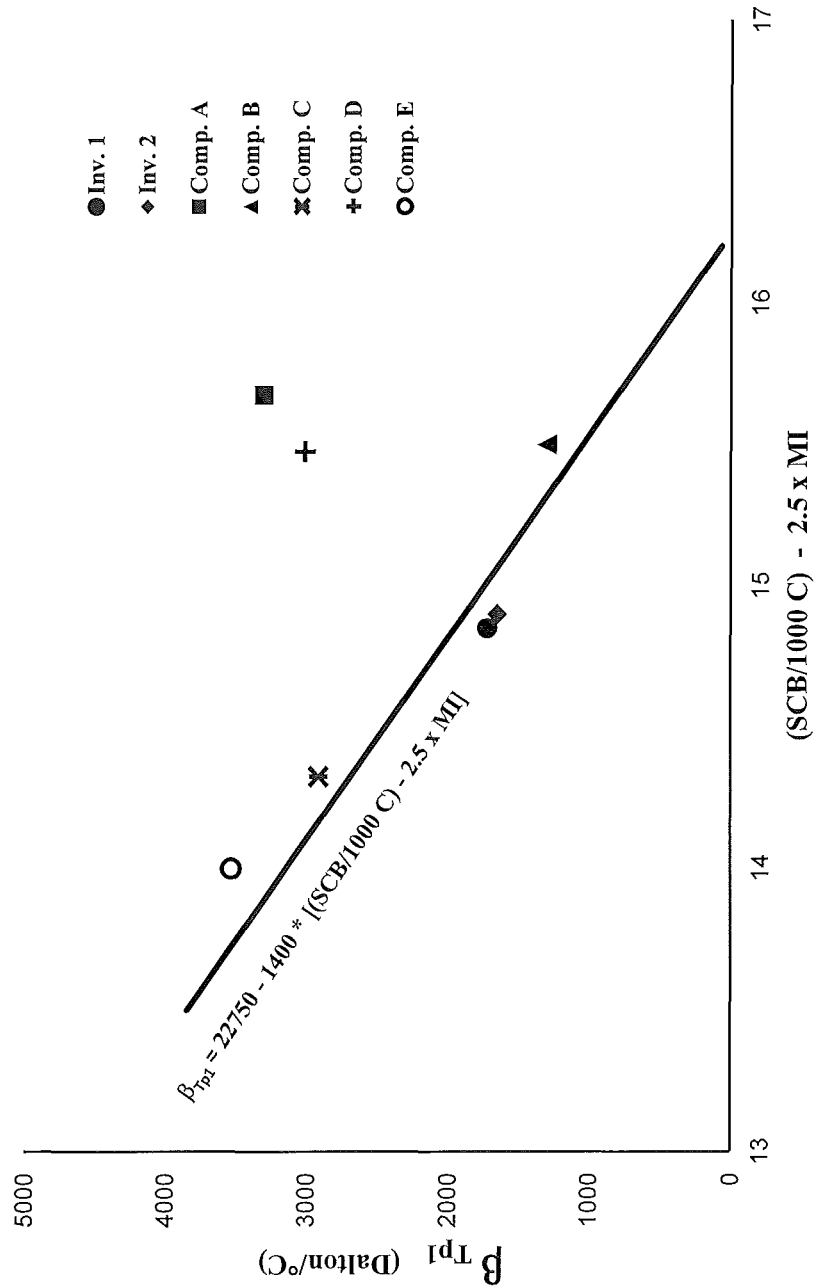
FIG. 3 shows a plot of the equation: $\beta_{T1}=22750-1400 \ (SCB/1000C-2.5\times I_2)$. The $\beta_{T1}$ values (the y-axis) are plotted against the term $SCB/1000C-2.5\times I_2$ (the x-axis) for inventive ethylene copolymers 1 and 2 as well as for several commercially available ethylene/1-hexene copolymers.

The inventive ethylene copolymers 1 and 2 are distinguished from the commercially available ethylene/1-hexene resins using the "characteristic composition distribution parameter", $\beta_{Tp1}$. As shown in FIG. 3, which plots $\beta_{Tp1}$ (on the y-axis) against (SCB/1000C−2.5×I$_2$) (on the x-axis) and shows a plot of the line corresponding to the condition where: $\beta_{T1}$=22750−1400 (SCB/1000C−2.5×I$_2$), the inventive ethylene copolymers 1 and 2 satisfy the condition: $\beta_{T1}$−22750−1400 (SCB/1000C−2.5×I$_2$), whereas each of the comparative ethylene copolymers A-E do not.

Figure 4:
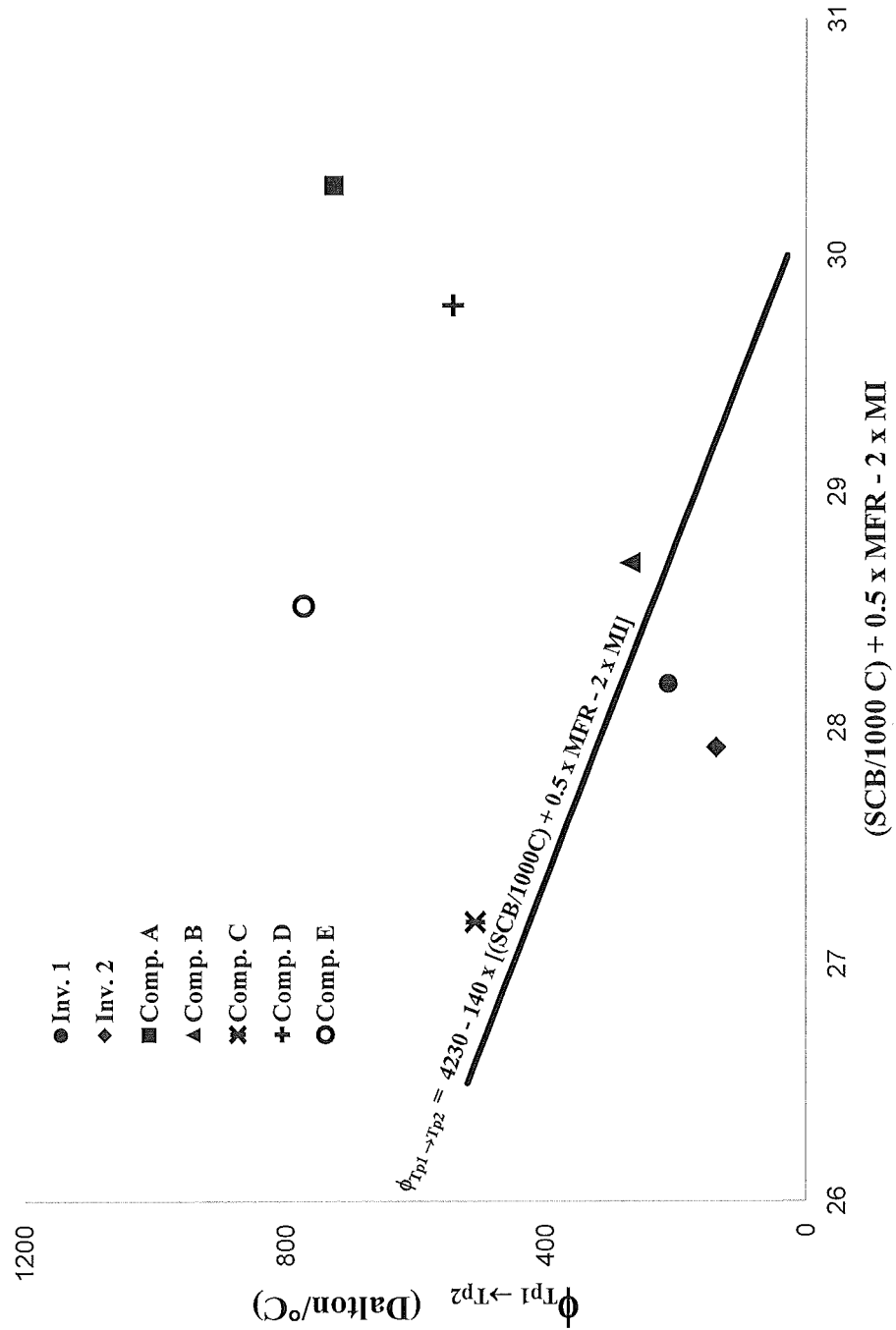
FIG. 4 shows a plot of the equation: $\phi_{T1 \to T2}=4230-140 \ [SCB/1000C+0.5\times(I_{21}/I_2)-2\times I_2]$. The $\phi_{Tp1 \to Tp2}$ values (the y-axis) are plotted against the term $[SCB/1000C+0.5\times(I_{21}/I_2)-2\times I_2]$ (the x-axis) for inventive ethylene copolymers 1 and 2 as well as for several commercially available ethylene/1-hexene copolymers.

The inventive ethylene copolymers 1 and 2 are further distinguished from the commercially available ethylene/1-hexene resins using the "characteristic composition transition parameter", $\phi_{Tp1 \rightarrow Tp2}$. As shown in FIG. 4, which plots $\phi_{Tp1 \rightarrow Tp2}$ (on the y-axis) against [SCB/1000C+0.5×(I$_{21}$/I$_2$)−2×I$_2$] (on the x-axis) and shows a plot of the line corresponding to the condition where: $\phi_{T1 \rightarrow T2}$=4230−140 [SCB/1000C+0.5×(I$_{21}$/I$_2$)−2×I$_2$], the inventive ethylene copolymers 1 and 2 satisfy the condition: $\phi_{T1 \rightarrow T2}$≤4230−140 [SCB/1000C+0.5×(I$_{21}$/I$_2$)−2×I$_2$], whereas each of the comparative ethylene copolymers A-E do not.

Blown Film

Conditions: Gloucester run conditions: 85 mil Die Gap, 100 lb/hr Output Rate; 14" Frost Line Height and T=425-430° C.; 1000 ppm of calcium stearate masterbatch was added to the resins while the films were made.

Film data for a film made from the inventive ethylene copolymer 1 is provided in Table 5 along with data for a film made from comparative ethylene copolymer A.

TABLE 5

Film Properties

| Ethylene Copolymer | Inv. 1 | | Comp. A | |
|---|---|---|---|---|
| Additives: Antiblock (ppm)/Slip (ppm) | 5109/1545 | | 6300/1500 | |
| Film Thickness/Blow-up Ratio | 0.8 mil/ 2.0:1 | 1.0 mil/ 2.5:1 | 0.8 mil/ 2.0:1 | 1.0 mil/ 2.5:1 |
| Dart Impact (g/mil) | 388 | 465 | 178 | 466 |
| ASTM Film Puncture @ Break | | | | |
| Maximum Force (lb) | 4.0 | 4.5 | 4.2 | 4.6 |
| Elongation (in.) | 2.1 | 2.1 | 2.1 | 2.1 |
| Total Energy (J/mm) | 30 | 27 | 31 | 28 |
| TEF & Lube Puncture (J/mm) | 44 | 40 | 46 | 44 |
| MD Tear (g/mil) | 436 | 404 | 456 | 446 |
| TD Tear (g/mil) | 895 | 655 | 981 | 676 |
| 1% MD Secant Modulus (MPa) | 194 | 199 | 182 | 170 |
| 1% TD Secant Modulus (MPa) | 196 | 208 | 174 | 181 |
| MD Tensile Strength (MPa) | 53.8 | 56.9 | 63.0 | 58.9 |
| MD Ultimate Elongation (%) | 440 | 615 | 387 | 584 |
| MD Yield Strength (MPa) | 10.1 | 10 | 9.7 | 8.8 |
| Gloss at 45° | 39 | 45 | 30 | 34 |
| Haze (%) | 17.9 | 16.6 | 22.1 | 20 |
| Reblock at 60° C. (gram) | 67 | 73 | 78 | 82 |

As can be seen by the data in Table 5, a 1 mil film made from the inventive copolymer 1 has a similar dart impact strength (465 g/mil) to an analogous film made from the comparative copolymer A (466 g/min) when the film is blown at a blow up ratio of 2.5:1. However, at a lower blow up ratio of 2:1, a 0.8 mil film made from the inventive copolymer 1 has a better dart impact strength of 388 g/mil, than an analogous film made from comparative copolymer A, where the dart impact strength is only 178 g/mil. As a result, the inventive composition offers greater dart impact values on a wider variety of commercially used blown film lines, many of which employ the lower blow up ratio.

Each of the films made from inventive copolymer 1 also had improved 1% MD secant modulus, and improved 1% TD secant modulus relative to analogous films made from comparative copolymer A. Also, with regard to both gloss and haze, each of the films made from inventive copolymer 1 have improved properties when compared to analogous films made from comparative copolymer A.

Non-limiting embodiments of the present disclosure include the following:

Embodiment A

An ethylene copolymer comprising ethylene and an alpha olefin having 3-8 carbon atoms, the ethylene copolymer having a density of from 0.912 g/cm$^3$ to 0.925 g/cm$^3$, a melt index (I$_2$) of from 0.1 g/10 min to 5.0 g/10 min, a melt flow ratio (I$_{21}$/I$_2$) of from 20 to 30, and a normal comonomer distribution profile in a GPC-FTIR analysis, wherein the normal comonomer distribution profile has a slope of from −3.5 to −7.5, where the slope is defined as the number of short chain branches per 1000 carbons at a molecular weight of 300,000 minus the number of short chain branches per 1000 carbons at a molecular weight of 30,000.

Embodiment B

The ethylene copolymer of Embodiment A wherein the ethylene copolymer has a characteristic composition distribution parameter, $\beta_{Tp1}$ which satisfies the relationship: $\beta_{Tp1}$≤22750−1400 (SCB/1000C−2.5×I$_2$).

Embodiment C

The ethylene copolymer of Embodiment A or B wherein the ethylene copolymer has a characteristic composition transition parameter, $\phi_{Tp1 \to Tp2}$ which satisfies the relationship: $\phi_{Tp1 \to Tp2} \leq 4230 - 140\ [SCB/1000C + 0.5 \times (I_{21}/I_2) - 2 \times I_2]$.

Embodiment D

The ethylene copolymer of Embodiment A, B, or C wherein the ethylene copolymer has a molecular weight distribution ($M_w/M_n$) of from 2.5 to 4.0.

Embodiment E

The ethylene copolymer of Embodiment A, B, C or D wherein the ethylene copolymer has a multimodal profile in a TREF analysis, the multimodal profile comprising two intensity maxima occurring at elution temperatures Tp1 and Tp2, wherein Tp1 is between 80° C. and 90° C. and Tp2 is between 90° C. and 100° C.

Embodiment F

The ethylene copolymer of Embodiment A, B, C, D, or E wherein less than 0.5 wt % of the ethylene copolymer elutes at a temperature of above 100° C. in a TREF analysis.

Embodiment G

The ethylene copolymer of Embodiment A, B, C, D, E, or F wherein the alpha-olefin is 1-hexene.

Embodiment H

The ethylene copolymer of Embodiment A, B, C, D, E, F, or G wherein the ethylene copolymer has a $CDBI_{50}$ of from 20 wt % to 40 wt %.

Embodiment I

The ethylene copolymer of Embodiment A, B, C, D, E, F, G, or H wherein the ethylene copolymer has a melt index ($I_2$) of from 0.2 to 2.0 g/10 min.

Embodiment J

The ethylene copolymer Embodiment A, B, C, D, E, F, G, H, or I wherein when made into a blown film having a 0.8 mil thickness at a die gap of 85 mil and a blow up ratio (BUR) of 2:1, has a dart impact of greater than 350 g/mil.

Embodiment K

The ethylene copolymer of Embodiment A, B, C, D, E, F, G, H, or I wherein the ethylene copolymer is made with a Ziegler-Natta catalyst.

Embodiment L

The ethylene copolymer of Embodiment A, B, C, D, E, F, G, H, or I wherein the ethylene copolymer is made with a Ziegler-Natta catalyst in a gas phase polymerization process.

Embodiment M

The ethylene copolymer of Embodiment K or L wherein the Ziegler-Natta catalyst comprises:

a) a calcined silica support;
b) a first aluminum compound having the formula $Al^1R_b(OR)_aX_{3-(a+b)}$, wherein a+b=3 and b≥1, R is a $C_{1-10}$ alkyl radical, and X is a chlorine atom;
c) a magnesium compound having the formula $Mg(R^5)_2$ where each $R^5$ is independently selected from the group consisting of $C_{1-8}$ alkyl radicals;
d) a reactive organic halide selected from the group consisting of $CCl_4$ and $C_{3-6}$ secondary and tertiary alkyl chlorides or a mixture thereof;
e) a titanium compound having the formula $Ti(OR^2)_cX_d$ wherein $R^2$ is selected from the group consisting of a $C_{1-4}$ alkyl radical, and a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom;
f) an electron donor wherein the electron donor is a trialkylamine compound; and
g) a second aluminum compound having the formula $Al^2R_b(OR)_aX_{3-(a+b)}$, wherein a+b=3 and b≥1, R is a $C_{1-10}$ alkyl radical, and X is a chlorine atom.

Embodiment N

The ethylene copolymer of Embodiment A, B, C, D, E, F, G, H, I, K, L, or M having a bulk density of greater than 25 lbs/ft³.

Embodiment O

A blown film comprising the ethylene copolymer of Embodiment A, B, C, D, E, F, G, H, I, K, L, or M.

Embodiment P

The blown film of Embodiment O having a dart impact of ≥350 g/mil when the film has a thickness of 0.8 mil and is made at a die gap of 85 mil and a blow up ratio (BUR) of 2:1.

Embodiment Q

The blown film of Embodiment O having a machine direction tear of ≥400 g/mil when the film has a thickness of 0.8 mil and is made at a die gap of 85 mil and a blow up ratio (BUR) of 2:1.

Embodiment R

An ethylene copolymer comprising ethylene and an alpha olefin having 3-8 carbon atoms, the ethylene copolymer having a density of from 0.912 g/cm³ to 0.925 g/cm³, a melt index ($I_2$) of from 0.1 g/10 min to 5.0 g/10 min, a melt flow ratio ($I_{21}/I_2$) of from 20 to 30, a normal comonomer distribution profile in a GPC-FTIR analysis, and a characteristic composition distribution parameter, $\beta_{Tp1}$ which satisfies the relationship: $\beta_{Tp1} \leq 22750 - 1400\ (SCB/1000C - 2.5 \times I_2)$.

Embodiment S

An ethylene copolymer comprising ethylene and an alpha olefin having 3-8 carbon atoms, the ethylene copolymer having a density of from 0.912 g/cm³ to 0.925 g/cm³, a melt index ($I_2$) of from 0.1 g/10 min to 5.0 g/10 min, a melt flow ratio ($I_{21}/I_2$) of from 20 to 30, a normal comonomer distribution profile in a GPC-FTIR analysis, and a characteristic composition transition parameter, $\phi_{Tp1 \rightarrow Tp2}$ which satisfies the relationship: $\phi_{Tp1 \rightarrow Tp2} \leq 4230-140$ [SCB/1000C+0.5×$(I_{21}/I_2)-2 \times I_2$].

What is claimed is:

1. A blown film comprising an ethylene copolymer comprising ethylene and an alpha olefin having 3-8 carbon atoms, the ethylene copolymer having a density of from 0.912 g/cm$^3$ to 0.925 g/cm$^3$, a melt index ($I_2$) of from 0.1 g/10 min to 5.0 g/10 min, a melt flow ratio ($I_{21}/I_2$) of from 20 to 30, and a normal comonomer distribution profile in a GPC-FTIR analysis, wherein the normal comonomer distribution profile has a slope of from −3.5 to −7.5, where the slope is defined as the number of short chain branches per 1000 carbons at a molecular weight of 300,000 minus the number of short chain branches per 1000 carbons at a molecular weight of 30,000.

2. The blown film of claim 1 wherein the ethylene copolymer has a characteristic composition distribution parameter, $\beta_{Tp1}$ which satisfies the relationship:

$\beta_{Tp1} \leq 22750-1400$ (SCB/1000C−2.5×$I_2$); wherein $\beta_{Tp1}$ has dimensions of (Daltons/° C.).

3. The blown film of claim 1 wherein the ethylene copolymer has a characteristic composition transition parameter, $\Phi_{Tp1 \rightarrow Tp2}$ which satisfies the relationship: $\Phi_{Tp1 \rightarrow Tp2} \leq 4230-140$ [SCB/1000C+0.5×$I_{21}/I_2$)−2×$I_2$]; wherein $\Phi_{Tp1 \rightarrow Tp2}$ has dimensions of (Daltons/° C.).

4. The blown film of claim 1 wherein the ethylene copolymer has a molecular weight distribution ($M_w/M_n$) of from 2.5 to 4.0.

5. The blown film of claim 1 wherein the ethylene copolymer has a multimodal profile in a TREF analysis, the multimodal profile comprising two intensity maxima occurring at elution temperatures Tp1 and Tp2, wherein Tp1 is between
80° C. and 90° C. and Tp2 is between 90° C. and 100° C.

6. The blown film of claim 1 wherein less than
0.5 wt % of the ethylene copolymer elutes at a temperature of above 100° C. in a TREF analysis.

7. The blown film of claim 1 wherein the alpha-olefin is 1-hexene.

8. The blown film of claim 1 wherein the ethylene copolymer has a CDBI$_{50}$ of from 20 wt % to 40 wt %.

9. The blown film of claim 1 wherein the ethylene copolymer has a melt index ($I_2$) of from 0.2 to 2.0 g/10 min.

10. The blown film of claim 1, having a 0.8 mil thickness at a die gap of 85 mil and a blow up ratio (BUR) of 2:1, has a dart impact of greater than 350 g/mil.

11. The blown film of claim 1 wherein the ethylene copolymer is made with a Ziegler-Natta catalyst.

12. The blown film of claim 1, wherein the ethylene copolymer is made in a gas phase polymerization process.

13. The blown film of claim 11 wherein the Ziegler-Natta catalyst comprises:
   a) a calcined silica support;
   b) a first aluminum compound having the formula Al$^1$R$_b$ (OR)$_a$X$_{3-(a+b)}$, wherein a+b=3 and b≥1,
   R is a C$_{1-10}$ alkyl radical, and X is a chlorine atom;
   c) a magnesium compound having the formula Mg(R$_5$)$_2$ where each R$_5$ is independently selected from the group consisting of C$_{1-8}$ alkyl radicals;
   d) a reactive organic halide selected from the group consisting of CCl$_4$ and C$_{3-6}$ secondary and tertiary alkyl chlorides or a mixture thereof;
   e) a titanium compound having the formula Ti(OR$_2$)$_c$X$_d$ wherein R$_2$ is selected from the group consisting of a C$_{1-4}$ alkyl radical, and a C$_{6-10}$ aromatic radical, X is selected from the group consisting of a chlorine atom and a bromine atom, c is 0 or an integer up to 4 and d is 0 or an integer up to 4 and the sum of c+d is the valence of the Ti atom;
   f) an electron donor wherein the electron donor is a trialkylamine compound; and
   g) a second aluminum compound having the formula Al$_2$R$_b$ (OR)$_a$X$_{3-(a+b)}$, wherein
   a+b=3 and b≥1, R is a C$_{1-10}$ alkyl radical, and X is a chlorine atom.

14. The blown film of claim 1, wherein the ethylene copolymer has a bulk density of greater than 25 lbs/ft$^3$.

15. The blown film of claim 1 having a machine direction tear of ≥400 g/mil when the film has a thickness of 0.8 mil and is made at a die gap of 85 mil and a blow up ratio (BUR) of 2:1.

* * * * *